(12) United States Patent
Tada et al.

(10) Patent No.: US 11,011,102 B2
(45) Date of Patent: May 18, 2021

(54) DISPLAY APPARATUS AND CONTROL METHOD THEREFOR

(71) Applicant: CANON KABUSHIKI KAISHA, Tokyo (JP)

(72) Inventors: Mitsuru Tada, Machida (JP); Takeshi Ikeda, Ebina (JP); Yasuo Suzuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/127,656

(22) Filed: Sep. 11, 2018

(65) Prior Publication Data

US 2019/0088193 A1 Mar. 21, 2019

(30) Foreign Application Priority Data

Sep. 21, 2017 (JP) .............................. JP2017-181309
Jun. 6, 2018 (JP) .............................. JP2018-108498
Jun. 26, 2018 (JP) .............................. JP2018-120723

(51) Int. Cl.
*G09G 3/22* (2006.01)
*G06F 3/0484* (2013.01)
*G09G 5/00* (2006.01)
*G09G 3/20* (2006.01)

(52) U.S. Cl.
CPC ........... *G09G 3/22* (2013.01); *G06F 3/04845* (2013.01); *G06F 3/04847* (2013.01); *G09G 3/2007* (2013.01); *G09G 5/006* (2013.01); *G09G 2320/0626* (2013.01); *G09G 2320/0686* (2013.01); *G09G 2330/021* (2013.01)

(58) Field of Classification Search
CPC ............ G09G 3/22; G09G 3/20; G09G 5/006; G09G 2320/0626; G09G 3/2007; G09G 2330/021; G09G 2320/0686; G09G 5/10; G06F 3/04847; G06F 3/04845
USPC ........................................................ 345/520
See application file for complete search history.

(56) References Cited

U.S. PATENT DOCUMENTS

| 6,072,621 A | 6/2000 | Kishi et al. |
| 6,221,267 B1 | 4/2001 | Ikeda et al. |
| 6,741,385 B2 | 5/2004 | Ikeda et al. |
| 6,800,871 B2 | 10/2004 | Matsuda et al. |

(Continued)

FOREIGN PATENT DOCUMENTS

| JP | 2007-298693 A | 11/2007 |
| JP | 2010-134455 A | 6/2010 |

(Continued)

OTHER PUBLICATIONS

Sep. 10, 2019 Japanese Official Action in Japanese Patent Appln. No. 2018-120723.

*Primary Examiner* — Jennifer Mehmood
*Assistant Examiner* — Kim Thanh T Tran
(74) *Attorney, Agent, or Firm* — Venable LLP

(57) ABSTRACT

A display apparatus according to the present invention includes: a display unit configured to display an image based on input image data on a screen; and a control unit configured to execute control to reduce an upper limit value of a display brightness range of a second area, which is different from a first area, of the screen of the display unit below an upper limit value of a display brightness range of the first area of the screen of the display unit, so that a power consumption of the display unit does not exceed a predetermined power consumption.

19 Claims, 19 Drawing Sheets

(56) References Cited

U.S. PATENT DOCUMENTS

| | | |
|---|---|---|
| 6,876,476 B1 | 4/2005 | Miura et al. |
| 6,879,372 B1 | 4/2005 | Takaragi et al. |
| 6,897,996 B2 | 5/2005 | Ikeda et al. |
| 6,919,003 B2 | 7/2005 | Ikeda et al. |
| 6,958,842 B2 | 10/2005 | Miura et al. |
| 6,975,337 B2 | 12/2005 | Yokoyama et al. |
| 7,009,627 B2 | 3/2006 | Abe et al. |
| 7,227,521 B2 | 6/2007 | Yamazaki et al. |
| 7,691,248 B2 | 4/2010 | Ikeda et al. |
| 7,889,168 B2 | 2/2011 | Yamazaki et al. |
| 9,529,562 B2 | 12/2016 | Takahashi et al. |
| 2004/0109612 A1* | 6/2004 | Park ............... G06T 5/009 382/254 |
| 2005/0206851 A1 | 9/2005 | Yokoyama et al. |
| 2006/0071940 A1* | 4/2006 | Ouchi ............ G09G 3/2092 345/600 |
| 2008/0018640 A1* | 1/2008 | Tada ............... G09G 3/3233 345/212 |
| 2008/0259099 A1* | 10/2008 | Arai .............. G09G 3/2003 345/690 |
| 2008/0297531 A1* | 12/2008 | Ueyama ........... G09G 3/2003 345/590 |
| 2009/0066819 A1* | 3/2009 | Ando ............. H04N 1/4074 348/254 |
| 2009/0174636 A1* | 7/2009 | Kohashikawa ...... G09G 3/3406 345/87 |
| 2009/0174795 A1* | 7/2009 | Kato ............ H04N 5/23222 348/234 |
| 2010/0137026 A1* | 6/2010 | Kim .............. H04N 9/3173 455/556.1 |
| 2010/0156955 A1* | 6/2010 | Kimura ............ G09G 3/36 345/690 |
| 2010/0171751 A1* | 7/2010 | Kim .............. G09G 3/3208 345/589 |
| 2010/0190529 A1* | 7/2010 | Morobishi ......... H04M 1/22 455/566 |
| 2013/0135354 A1* | 5/2013 | Ookawara ......... G09G 3/3406 345/660 |
| 2014/0285111 A1* | 9/2014 | Takahashi ........ H05B 47/175 315/294 |
| 2015/0138257 A1* | 5/2015 | Imai ............. G09G 3/3208 345/691 |
| 2015/0325178 A1* | 11/2015 | Nagashima ........ G09G 3/34 345/590 |
| 2015/0356904 A1* | 12/2015 | Nakatani ......... G09G 5/377 345/690 |
| 2016/0296104 A1* | 10/2016 | Smith ............ A61B 1/00096 |
| 2017/0061894 A1 | 3/2017 | Ikeda et al. |
| 2017/0132488 A1 | 5/2017 | Asanuma |
| 2017/0163948 A1 | 6/2017 | Morisawa et al. |
| 2018/0096660 A1* | 4/2018 | Liu .............. G09G 3/2003 |
| 2019/0137930 A1* | 5/2019 | Ishida ........... G03G 15/2017 |

FOREIGN PATENT DOCUMENTS

| | | |
|---|---|---|
| JP | 2017-045030 A | 3/2017 |
| JP | 2017-090595 A | 5/2017 |

* cited by examiner

FIG. 3

| BRIGHTNESS VALUE | POWER CONSUMPTION |
|---|---|
| 0 | 0 |
| 1 | 0.1 |
| 2 | 0.2 |
| ... | ... |
| 254 | 9.9 |
| 255 | 10 |

| 0.3 | 0.3 | 0.3 | 0.3 | 0.3 | 0.3 | 0.3 | 0.3 |
| --- | --- | --- | --- | --- | --- | --- | --- |
| 0.3 | 0.3 | 0.3 | 0.3 | 0.3 | 1.0 | 1.0 | 0.3 |
| 0.3 | 1.0 | 0.3 | 0.3 | 0.3 | 1.0 | 1.0 | 0.3 |
| 1.0 | 1.0 | 1.0 | 0.3 | 0.3 | 0.3 | 0.3 | 0.3 |
| 1.0 | 1.0 | 1.0 | 0.3 | 0.3 | 0.3 | 0.3 | 0.3 |
| 0.3 | 0.3 | 0.3 | 0.3 | 0.3 | 0.3 | 0.3 | 0.3 |

| 0.2 | 0.2 | 0.2 | 0.2 | 0.2 | 0.2 | 0.2 | 0.2 |
| --- | --- | --- | --- | --- | --- | --- | --- |
| 0.2 | 0.2 | 0.2 | 0.2 | 0.2 | 0.67 | 0.67 | 0.2 |
| 0.2 | 0.67 | 0.2 | 0.2 | 0.2 | 0.67 | 0.67 | 0.2 |
| 0.67 | 0.67 | 0.67 | 0.2 | 0.2 | 0.2 | 0.2 | 0.2 |
| 0.67 | 0.67 | 0.67 | 0.2 | 0.2 | 0.2 | 0.2 | 0.2 |
| 0.2 | 0.2 | 0.2 | 0.2 | 0.2 | 0.2 | 0.2 | 0.2 |

DISPLAY APPARATUS AND CONTROL METHOD THEREFOR

BACKGROUND OF THE INVENTION

Field of the Invention

The present invention relates to a display apparatus and a control method therefor.

Description of the Related Art

In a display apparatus (an HDR (High Dynamic Range) monitor) that is compatible with high brightness display, an upper limit value (a peak brightness) of the display brightness may be controlled (loading control) in order to reduce the power consumption of the display apparatus. For example, when an average brightness of a display image is high, control is executed to reduce the peak brightness in order to reduce the power consumption of the display apparatus.

When the upper limit value of the display brightness is reduced, the overall display brightness of the display image decreases. As a result of the processing for reducing the upper limit value of the display brightness, as described above, when a user implements brightness adjustment processing to increase the brightness of the display image, the intended brightness adjustment processing may not be realized. In particular, an intended adjustment result is not obtained from the processing to adjust the brightness of a part of the display image.

In an image display control apparatus described in Japanese Patent Application Publication No. 2017-90595, the visibility of an area of interest within an image displayed by an image display apparatus is improved by reducing a brightness value outside the area of interest.

SUMMARY OF THE INVENTION

With the technique disclosed in Japanese Patent Application Publication No. 2017-90595, however, in a case where the power consumption cannot be reduced sufficiently even after reducing the display brightness outside the area of interest, loading control is further executed, and as a result, it may be impossible to display a display image at the brightness desired by the user.

The present invention in its first aspect provides a display apparatus comprising:

a display unit configured to display an image based on input image data on a screen; and a control unit configured to execute control to reduce an upper limit value of a display brightness range of a second area, which is different from a first area, of the screen of the display unit below an upper limit value of a display brightness range of the first area of the screen of the display unit, so that a power consumption of the display unit does not exceed a predetermined power consumption.

The present invention in its second aspect provides a control method for a display apparatus, comprising:

displaying an image based on input image data on a screen; and executing control to reduce an upper limit value of a display brightness range of a second area, which is different from a first area, of the screen of the display unit below an upper limit value of a display brightness range of the first area of the screen of the display unit, so that a power consumption of the display unit does not exceed a predetermined power consumption.

The present invention in its third aspect provides a non-transitory computer readable medium that stores a program, wherein the program causes a computer to execute:

displaying an image based on input image data on a screen; and executing control to reduce an upper limit value of a display brightness range of a second area, which is different from a first area, of the screen of the display unit below an upper limit value of a display brightness range of the first area of the screen of the display unit, so that a power consumption of the display unit does not exceed a predetermined power consumption.

Further features of the present invention will become apparent from the following description of exemplary embodiments with reference to the attached drawings.

BRIEF DESCRIPTION OF THE DRAWINGS

FIG. 3 is a schematic view showing an example of table data according to the first to third embodiments;

FIG. 14A is a schematic view showing an example of input image data according to the fifth embodiment, and FIG. 14B is a schematic view showing an example of emission brightnesses of respective light sources, which are set on the basis of the input image data;

DESCRIPTION OF THE EMBODIMENTS

First Embodiment

A first embodiment of the present invention will be described below.

Configuration of Display Apparatus

Figure 1:
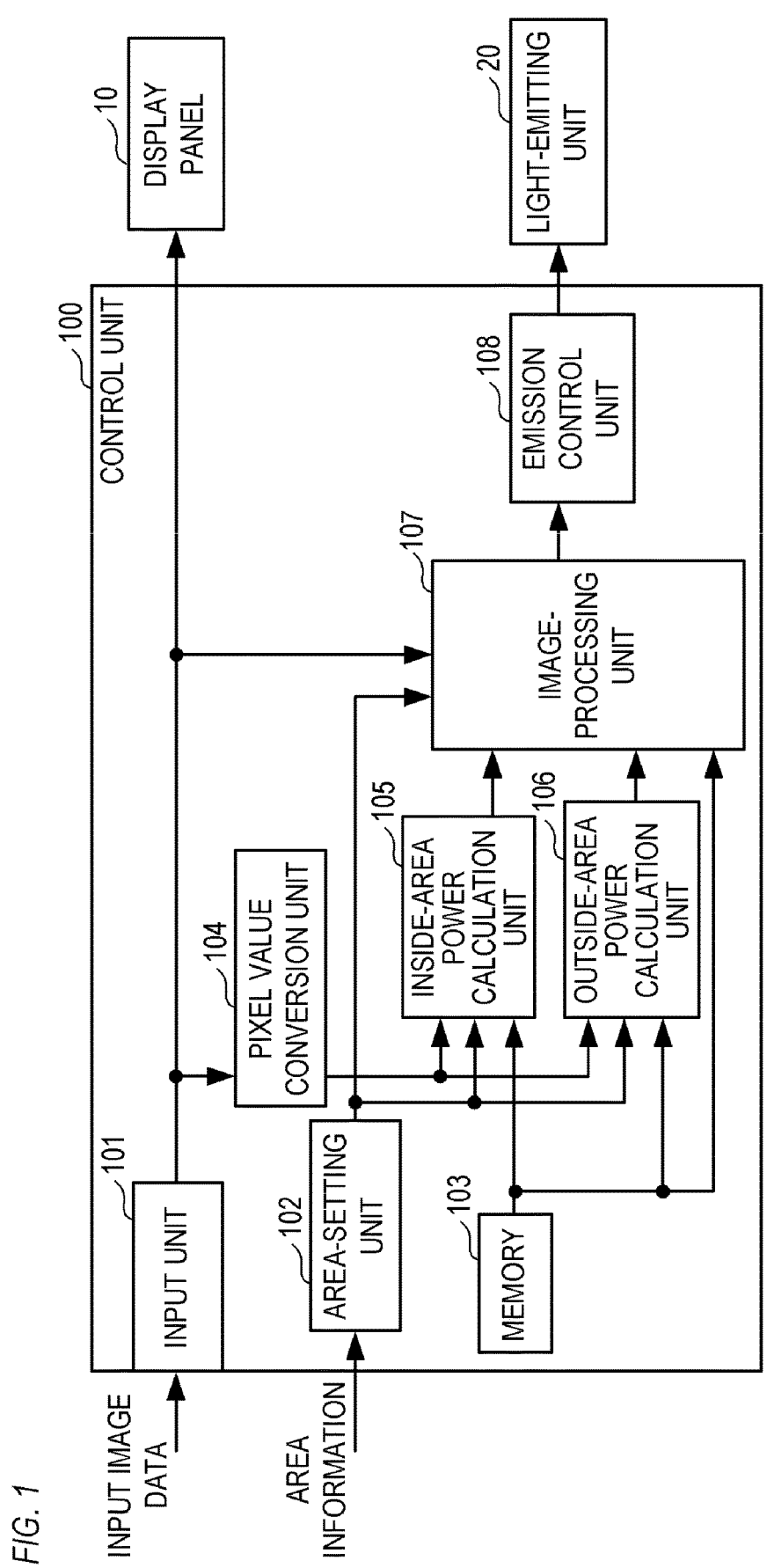
FIG. 1 is a block diagram showing an example configuration of a display apparatus according to a first embodiment.

FIG. 1 is a block diagram showing an example configuration of a display apparatus according to this embodiment. The display apparatus according to this embodiment includes a display panel 10, a light-emitting unit 20, and a control unit 100.

The control unit 100 includes an input unit 101, an area-setting unit 102, a memory 103, a pixel value conversion unit 104, an inside-area power calculation unit 105, an outside-area power calculation unit 106, an image-processing unit 107, and an emission control unit 108. It is assumed that respective functions of the memory 103, the pixel value conversion unit 104, the inside-area power calculation unit 105, the outside-area power calculation unit 106, the image-processing unit 107, and the emission control unit 108 are executed by electronic circuits mounted on a control circuit board of the display apparatus.

An image based on input image data (image data input into the display apparatus) is displayed on a screen by the display panel 10 and the light-emitting unit 20.

The display panel 10 is a transmissive display panel that displays an image on the screen by transmitting light emitted from the light-emitting unit 20 on the basis of the input image data. The display panel 10 is constituted by a liquid crystal panel, a MEMS (Micro Electro Mechanical System) shutter-type display panel, or the like, for example.

Figure 2:
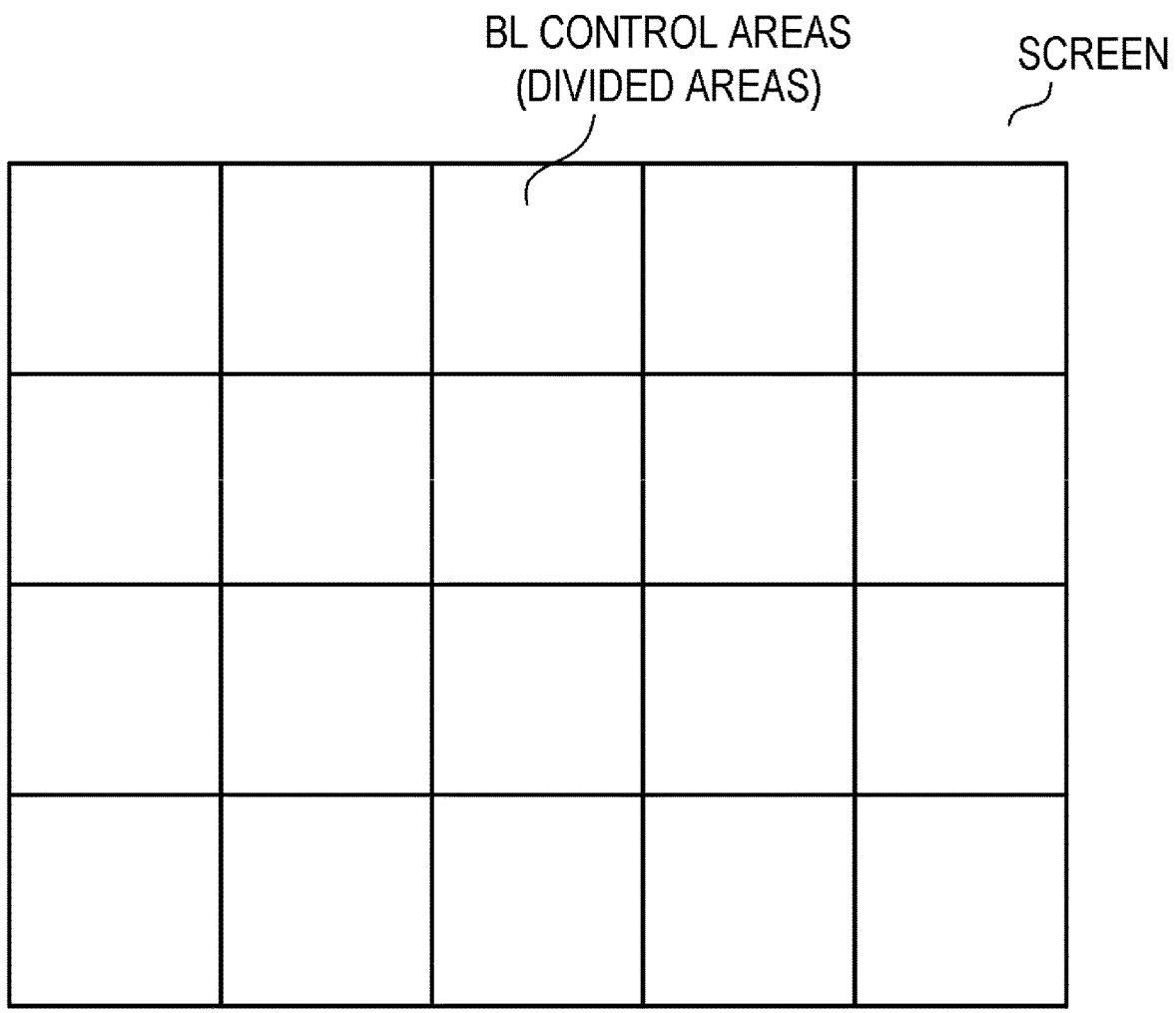
FIG. 2 is a schematic view showing an example of a plurality of BL control areas according to first to third embodiments.

The light-emitting unit 20 includes a plurality of light source units. When the display apparatus is a liquid crystal display apparatus or the like, the light-emitting unit 20 is known as a "backlight unit" or the like. Each light source unit includes one or more light-emitting elements. The light-emitting elements are constituted by LEDs (light-emitting diodes), organic EL (Electro-Luminescence) elements, laser light sources, cold cathode tubes, or the like. In this embodiment, the plurality of light source units are respectively associated with a plurality of BL control areas on the screen. Each BL control area forms a part of the screen. FIG. 2 is a schematic view showing an example of the plurality of BL control areas. In the example shown in FIG. 2, the plurality of BL control areas are constituted by a plurality of divided areas forming the screen. More specifically, the plurality of BL control areas are constituted by 20 divided areas (rectangular areas) arranged in a 4×5 matrix. When the emission brightness of a light source unit is varied, the brightness of the light emitted onto the BL control area corresponding to the light source unit changes.

Note that the BL control areas are not limited to divided areas obtained by dividing the screen. The BL control areas may be separated from other BL control areas, and at least some of the BL control areas may overlap at least some of the other BL control areas. A correspondence relationship between the BL control area and the light source unit does not have to be a 1-to-1 correspondence relationship. For example, two or more light source units may be associated with a single BL control area. There are no particular limitations on the arrangement of the BL control areas, the number of BL control areas, the shape of the BL control areas, and so on. For example, the plurality of BL control areas may be arranged in a diamond check pattern, and the number of BL control areas may be set at more or less than 20. As regards the shape of the BL control areas, the BL control areas may be triangular, hexagonal, circular, and so on. There are likewise no particular limitations on the arrangement of the light source units and the number of light source units.

The input unit 101 is an interface on which to input the input image data. It is assumed that the input image data are input from an output apparatus on the exterior of the display apparatus. Note that the input image data may be input into the input unit 101 from a storage medium, not shown in the figures, of the display apparatus.

The area-setting unit 102 sets a target area on the screen. As will be described below, the target area is an area of the screen in which peak brightness reduction for the purpose of power consumption control is suppressed. An area of the screen that is not the target area is set as a non-target area. The area-setting unit 102 sets the target area on the screen in response to an operation performed by a user on an operation unit such as a GUI, not shown in the figures. The area-setting unit 102 outputs information (area information) specifying the position of the target area on the screen to the inside-area power calculation unit 105, the outside-area power calculation unit 106, and the image-processing unit 107. The target area is an area of interest that is interesting to the user, a focus area on which the user wishes to focus, or the like, for example.

Note that the user may specify the non-target area alone or both the target area and the non-target area. Area information indicating only the non-target area may be input into the display apparatus, or area information indicating both the target area and the non-target area may be input into the display apparatus. The target area and the non-target area may be determined and set automatically by the display apparatus instead of being determined and set in accordance with a user operation. For example, an area displaying a predetermined object (the sun, a star, a person, a vehicle, or the like) may be determined automatically as the target area, or a predetermined area (a central part of the screen or the like) may be used as the target area.

The user can specify a desired area on the screen as the target area. Further, to facilitate execution of processing to be described below, an area constituted by a BL control area can be specified as the target area.

The memory 103 stores table data showing respective correspondence relationships between the emission brightnesses of the light source units and the power consumptions of the light source units. FIG. 3 is a schematic view showing an example of the table data recorded in the memory 103. In this embodiment, the emission brightness of each light source unit is controlled individually on the basis of the image data. In the table data shown in FIG. 3, a brightness value of the image data is shown in place of the emission brightness of the light source unit. In this embodiment, the emission brightness of the light source unit is controlled to a steadily higher emission brightness as the brightness value of the image data increases. As the emission brightness of the light source unit increases, the power consumption of the light source unit increases. In the table data shown in FIG. 3, therefore, the power consumption of the light source unit increases as the brightness value of the image data increases.

Note that information different from the brightness value of the image data may be shown in the table data as information corresponding to the emission brightness of the light source unit. For example, the emission brightness of the light source unit, a BL control value for controlling the emission brightness of the light source unit, a pixel value of the image data, another gradation value (an R value, a G value, a B value, or the like) of the image data, a histogram of the pixel values of the image data, a histogram of the gradation values of the image data, and so on may be shown. Further, a function or the like indicating the correspondence relationship between the emission brightness of the light source unit and the power consumption of the light source unit may be prepared in place of the table data.

The pixel value conversion unit 104 converts the pixel values of the input image data into respective brightness values Y, and outputs the brightness values Y to the inside-area power calculation unit 105 and the outside-area power calculation unit 106. For example, when the pixel values of the input image data are RGB values (R value, G value, B value)=(R, G, B), the pixel value conversion unit 104 calculates the brightness value Y using formula 1, shown below. In formula 1, "α", "β", and "γ" are predetermined coefficients (brightness conversion coefficients) for converting RGB values into Y values. Note that the pixel values of the input image data are not limited to RGB values. For example, the pixel values of the input image data may be YCbCr values. In this case, the pixel value conversion unit 104 may obtain the Y value of the YCbCr values as the brightness value Y.

$$Y = \alpha \times R + \beta \times G + \gamma \times B \quad \text{(formula 1)}$$

The inside-area power calculation unit 105 determines the light source units corresponding to the target area on the basis of the area information. The light source units corresponding to the target area are the light source units corresponding to the BL control areas that include at least a part of the target area. Note that the light source units corresponding to the BL control areas that do not include the non-target area may also be set as the light source units corresponding to the target area. The inside-area power calculation unit 105 calculates a total power consumption WIS of all of the light source units corresponding to the target area on the basis of the brightness values Y output from the pixel value conversion unit 104 and the table data recorded in the memory 103. The inside-area power calculation unit 105 then outputs the total power consumption WIS to the image-processing unit 107. The total power consumption WIS is a power consumption in a case where image processing is not executed by the image-processing unit 107.

The outside-area power calculation unit 106 determines the light source units corresponding to the non-target area on the basis of the area information. The light source units corresponding to the non-target area are assumed to be the light source units other than the light source units corresponding to the target area, for example the light source units corresponding to the BL control areas that do not include the target area. Note that the light source units corresponding to the non-target area may also be the light source units corresponding to the BL control areas that include at least a part of the non-target area, the light source units corresponding to the BL control areas including only the non-target area, and so on. The outside-area power calculation unit 106 calculates a total power consumption WOS of all of the light source units corresponding to the non-target area on the basis of the brightness values Y output from the pixel value conversion unit 104 and the table data recorded in the memory 103. The outside-area power calculation unit 106 then outputs the total power consumption WOS to the image-processing unit 107. The total power consumption WOS is a power consumption in a case where image processing is not executed by the image-processing unit 107.

Note that there are no particular limitations on the method for calculating the total power consumptions WIS and WOS. For example, the emission brightnesses of the light source units, the BL control values, the pixel values of the image data, other gradation values (the R value, the G value, the B value, or the like) of the image data, a histogram of the pixel values of the image data, a histogram of the gradation values of the image data, and so on may be used instead of the brightness values Y.

The image-processing unit 107 executes control to reduce an upper limit value of a display brightness range (a range of the brightness that can be displayed on the screen) of the non-target area below the upper limit value of the display brightness range of the target area so that the power consumption of the display unit (more specifically, the light-emitting unit 20) does not exceed a predetermined power consumption. The upper limit value of the display brightness range is a display brightness (a brightness on the screen) in a case where a white area of the input image data is displayed on the display unit (more specifically, the display panel 10), for example. In this embodiment, the image-processing unit 107 processes a part of the input image data corresponding to the non-target area so that the power consumption of the light-emitting unit 20 is held at or below the predetermined power consumption without modifying the display brightness of the target area. More specifically, the image-processing unit 107 reduces the display brightness of the non-target area by reducing (correcting) the pixel values of the part of the input image data that corresponds to the non-target area. As a result, corrected image data, which are image data that have been subjected to image processing (processing for reducing the pixel values corresponding to the non-target area), are generated. The part of the input image data that corresponds to the non-target area may also be referred to as the part of the input image data that is displayed in the non-target area. The image-processing unit 107 reduces the pixel values of the part of the input image data that corresponds to the non-target area on the basis of the total power consumptions WIS and WOS and the table data recorded in the memory 103. The image-processing unit 107 then outputs the corrected image data to the emission control unit 108. Note that the gradation values used in the image processing are not limited to the R value, the G value, and the B value. The brightness value, for example, may be used in the image processing.

The emission control unit 108 controls the emission brightness of each of the light source units on the basis of the brightness of the part of the input image data that corresponds to the relevant light source unit. The emission control unit 108 controls the emission brightnesses of the light source units corresponding to the non-target area so that the power consumption of the display unit (more specifically, the light-emitting unit 20) does not exceed the predetermined power consumption. In this embodiment, the emission control unit 108 controls the emission brightness of each of the plurality of light source units provided in the light-emitting unit 20 individually on the basis of the corrected image data output from the image-processing unit 107. More specifically, the emission control unit 108 determines a BL control value of each light source unit on the basis of the image data output from the image-processing unit 107. The emission control unit 108 then outputs the BL control values of the respective light source units to the light-emitting unit 20. Each light source unit emits light at an emission brightness corresponding to the BL control value corresponding thereto. As a result, the emission brightnesses of the light source units corresponding to the non-target area are reduced (controlled) so that the power consumption of the light-emitting unit 20 is held at or below the predetermined power consumption without modifying the brightness of the target area.

In this embodiment, the emission control unit 108 calculates, for each of the plurality of light source units, an average pixel value (an average value of the RGB values) of the BL control area corresponding to the relevant light source unit on the basis of the image data output from the image-processing unit 107. The emission control unit 108 then determines a BL control value for each of the plurality of light source units in accordance with the average pixel value calculated in relation to the relevant light source unit. The BL control value is determined such that the emission brightness of the light source unit is controlled to a steadily higher emission brightness as the average pixel value increases.

Note that the method for determining the emission brightness (the BL control value) of the light source unit is not limited to the method described above. For example, a different representative value (a maximum value, a minimum value, the mode, the median, or the like) to the average value may be used. A different gradation value such as the brightness value may also be used. The emission brightness of the light source unit may also be controlled on the basis of a histogram of pixel values or gradation values. As long as the upper limit value of the display brightness range of the non-target area is reduced below the upper limit value of the display brightness range of the target area so that the power consumption of the display unit (more specifically, the light-emitting unit 20) does not exceed the predetermined power consumption, the emission brightnesses of the respective light source units may be determined without referring to the corrected image data. For example, emission brightnesses (provisional emission brightnesses) of the respective light source units may be determined in accordance with the input image data, whereupon the emission brightnesses of the respective light source units may be determined by correcting the provisional emission brightnesses determined in relation to the light source units corresponding to the non-target area. More specifically, the emission brightness of each of the light source units may be determined by multiplying a coefficient by a PWM control value (a duty ratio corresponding to the provisional emission brightness) of each light source unit, which is determined in accordance with the input image data. A substantially equal value to a value obtained by dividing the predetermined power consumption by a total power consumption WS, to be described below, for example, is used as the coefficient multiplied by the PWM control value. In this case, the corrected image data do not have to be generated.

Processing of Inside-area Power Calculation Unit 105

A specific example of the processing executed by the inside-area power calculation unit 105 will now be described.

Step 1-1

The inside-area power calculation unit 105 determines (specifies) a light source unit corresponding to the target area on the basis of the area information.

Step 1-2

The inside-area power calculation unit 105 calculates an average brightness value YAG (an average value of the brightness values Y) of the BL control area corresponding to the light source unit specified in step 1-1 on the basis of the brightness values Y output from the pixel value conversion unit 104. When a plurality of light source units are specified in step 1-1, the processing of step 1-2 is executed on each of the plurality of specified light source units.

Step 1-3

The inside-area power calculation unit 105 obtains a power consumption WI corresponding to the average brightness value YAG calculated in step 1-2 from the table data recorded in the memory 103. When a plurality of light source units are specified in step 1-1, the processing of step 1-3 is executed on each of the plurality of specified light source units.

Step 1-4

The inside-area power calculation unit 105 calculates a sum of all of the power consumptions WI obtained in step 1-3 as the total power consumption WIS, and outputs the total power consumption WIS to the image-processing unit 107.

Processing of Outside-area Power Calculation Unit 106

A specific example of the processing executed by the outside-area power calculation unit 106 will now be described.

Step 2-1

The outside-area power calculation unit 106 determines (specifies) a light source unit corresponding to the non-target area on the basis of the area information.

Step 2-2

The outside-area power calculation unit 106 calculates the average brightness value YAG of the BL control area corresponding to the light source unit specified in step 2-1 on the basis of the brightness values Y output from the pixel value conversion unit 104. When a plurality of light source units are specified in step 2-1, the processing of step 2-2 is executed on each of the plurality of specified light source units.

Step 2-3

The outside-area power calculation unit 106 obtains a power consumption WO corresponding to the average brightness value YAG calculated in step 2-2 from the table data recorded in the memory 103. When a plurality of light source units are specified in step 2-1, the processing of step 2-3 is executed on each of the plurality of specified light source units.

Step 2-4

The outside-area power calculation unit 106 calculates a sum of all of the power consumptions WO obtained in step 2-3 as the total power consumption WOS, and outputs the total power consumption WOS to the image-processing unit 107.

Processing of Image-processing Unit 107

A specific example of the processing executed by the image-processing unit 107 will now be described. Here, of the plurality of RGB values (R values, G values, and B values) prior to the image processing, the RGB values corresponding to the target area will be described as "RGB values (Rpi, Gpi, Bpi)", while the RGB values corresponding to the non-target area will be described as "RGB values (Rpo, Gpo, Bpo)". Further, of the plurality of RGB values following the image processing, the RGB values corresponding to the target area will be described as "RGB values (Rqi, Gqi, Bqi)", while the RGB values corresponding to the non-target area will be described as "RGB values (Rqo, Gqo, Bqo)". Furthermore, the number of light source units corresponding to the target area will be described as "SI", and the number of light source units corresponding to the non-target area will be described as "SO". A threshold of the power consumption (the predetermined power consumption) will be described as "THW". The threshold THW may be a fixed value determined in advance or a value that can be modified by the user.

Step 3-1

The image-processing unit 107 calculates a sum of the power information WIS and the power information WOS as the total power consumption WS of all of the light source units provided in the light-emitting unit 20. The total power consumption WS is a power consumption in a case where an image is displayed on the display unit on the basis of the input image data. In this embodiment, the total power consumption WS is a power consumption in a case where the respective light source units are controlled to emit light at the provisional emission brightnesses of the respective light source units, set on the basis of the brightness of the part of the input image data corresponding to each light source unit. More specifically, the total power consumption WS is a power consumption in a case where image processing is not executed by the image-processing unit 107. In this embodiment, the emission brightnesses of the respective light source units are corrected on the basis of the total power consumption WS and the threshold THW. More specifically, the corrected image data are generated on the basis of the total power consumption WS and the threshold THW.

Step 3-2

When the total power consumption WS calculated in step 3-1 is equal to or lower than the threshold THW, the image-processing unit 107 generates the corrected image data by calculating the RGB values following the image processing (the RGB values of the corrected image data) using formulae 2 and 3, shown below. In other words, when the total power consumption WS is equal to or lower than the threshold THW, the RGB values before and after the image processing do not vary, and therefore the generated corrected image data are identical to the input image data.

$$(Rqi, Gqi, Bqi) = (Rpi, Gpi, Bpi) \quad \text{(formula 2)}$$

$$(Rqo, Gqo, Bqo) = (Rpo, Gpo, Bpo) \quad \text{(formula 3)}$$

When the total power consumption WS calculated in step 3-1 is larger than the threshold THW, the image-processing unit 107 generates the corrected image data by calculating the RGB values following the image processing using formulae 4 to 6, shown below. In formula 6, "K ($\varepsilon$)" denotes the average brightness value YAG associated with a power consumption $\varepsilon$ in the table data recorded in the memory 103. Note that K ($\varepsilon$) may be any average brightness value YAG that corresponds to a power consumption no greater than the power consumption $\varepsilon$. K ($\varepsilon$) may also be the average brightness value YAG corresponding to a power consumption ($\varepsilon-\Delta\varepsilon$) obtained by subtracting a predetermined margin ($\Delta\varepsilon$) from the power consumption $\varepsilon$. It is assumed, however, that the gradation value K ($\varepsilon$) takes a value of at least 0. There are no particular limitations on the number of bits in the gradation values such as the R value, the G value, the B value, and the brightness value Y, but in this embodiment, these gradation values are 8-bit values (0 to 255). According to formula 6, the plurality of gradation values corresponding to the non-target area are reduced at a common reduction rate (K ($\varepsilon$)/255).

$$(Rqi, Gqi, Bqi) = (Rpi, Gpi, Bpi) \quad \text{(formula 4)}$$

$$\varepsilon = (WOS - (WS - THW)/SO \quad \text{(formula 5)}$$

$$(Rqo, Gqo, Bqo) = (Rpo \times (K(\varepsilon)/255), Gpo \times (K(\varepsilon)/255), Bpo \times (K(\varepsilon)/255)) \quad \text{(formula 6)}$$

Display

A specific example of display by the display apparatus according to this embodiment will now be described.

Figure 4A:
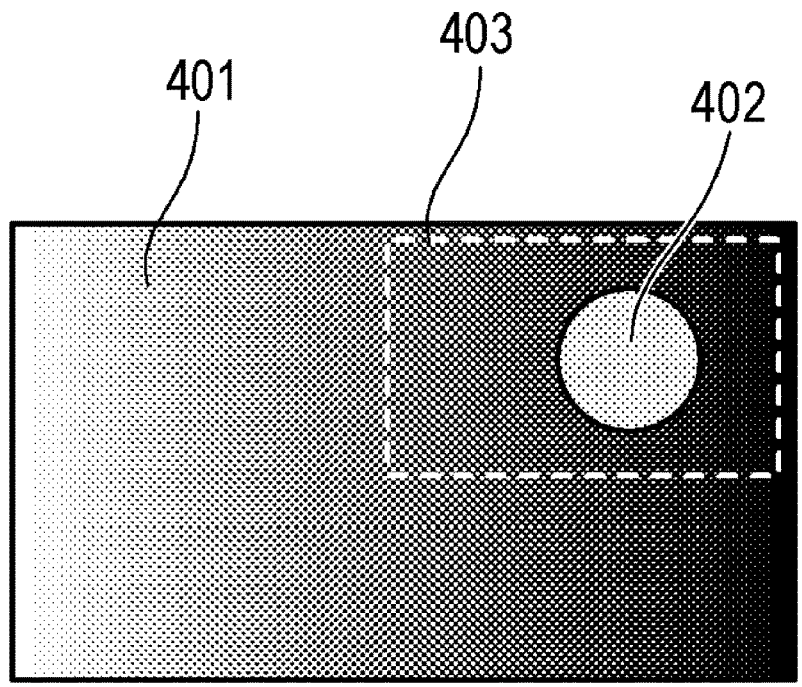
FIGS. 4A and 4B are schematic views showing examples of an input image according to the first embodiment.
Figure 4B:
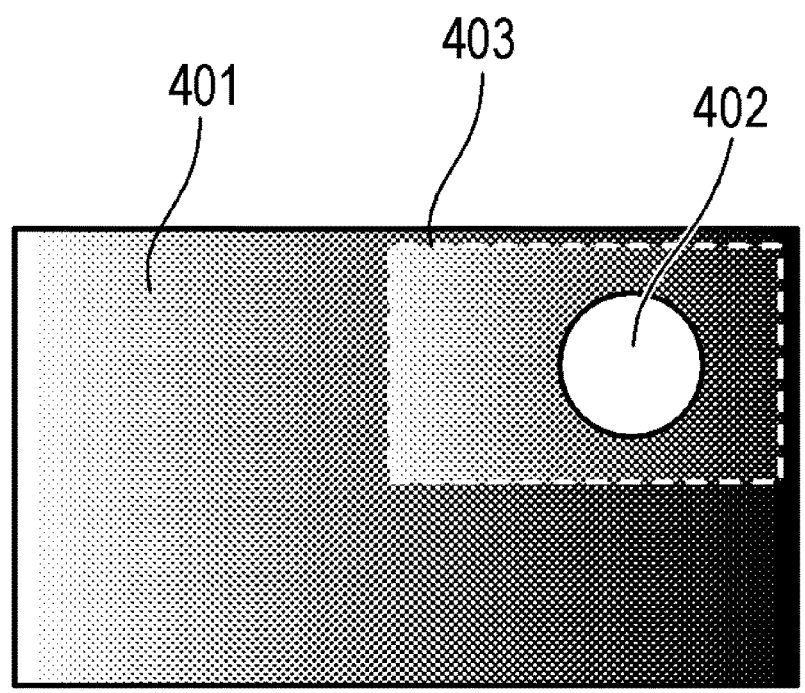

FIGS. 4A and 4B are schematic views showing examples of an image (an input image) displayed in accordance with the input image data. In FIGS. 4A and 4B, a circular object 402 is depicted on a background 401, and a target area 403 including an area in which the circular object 402 is displayed has been specified. Here, an example in which the user issues an instruction to increase the brightness of the target area 403 will be described. When the instruction to increase the brightness of the target area 403 is issued, the input image data are updated so that the brightness of the target area 403 is increased in accordance with the instruction. FIG. 4A shows the input image before being updated, and FIG. 4B shows the input image after being updated.

Figure 5:
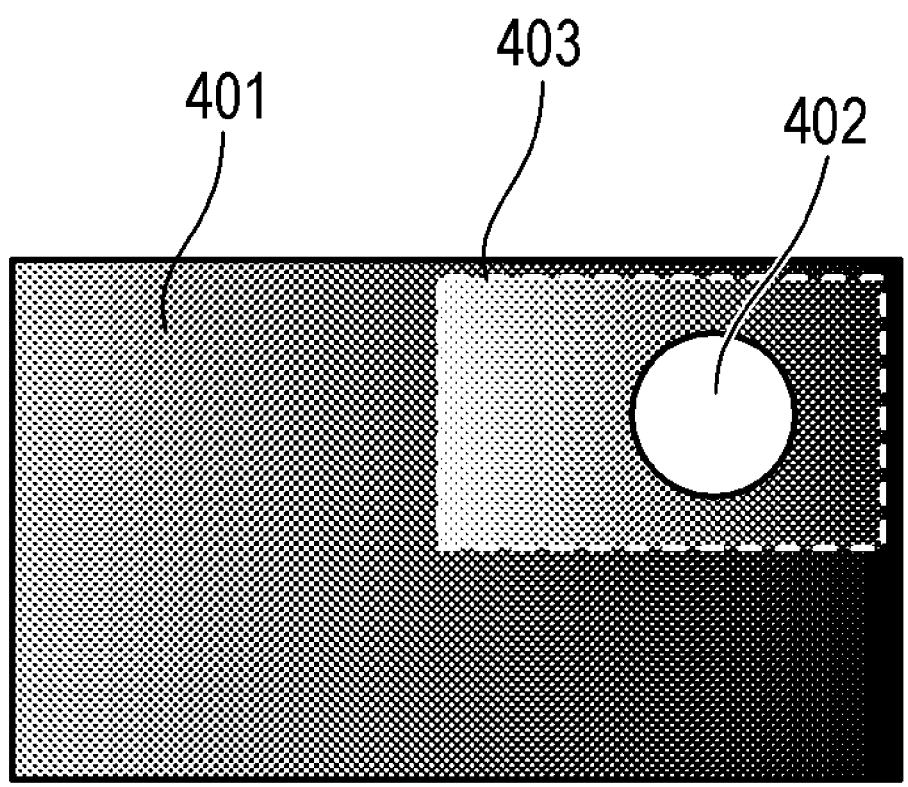
FIG. 5 is a schematic view showing an example of a display image according to the first embodiment.

FIG. 5 is a schematic view showing an example of an image (a display image) displayed by the display apparatus. It is evident from FIG. 5 that the brightness of the target area 403 has been increased from the brightness in FIG. 4A in response to the instruction from the user so that the brightness of the target area 403 is equal to the brightness in FIG. 4B. It is also evident that the brightness of the area outside the target area 403 has been reduced from the brightness in FIGS. 4A and 4B so that the total power consumption WS does not exceed the threshold THW.

According to this embodiment, as described above, control is executed to reduce the upper limit value of the display brightness range of the non-target area below the upper limit value of the display brightness range of the target area so that the power consumption of the display unit does not exceed the predetermined power consumption. In so doing, the power consumption can be reduced, and an image that is more favorable to the user can be displayed. More specifically, an intended adjustment result can be obtained during image quality adjustment (brightness adjustment and so on) in the target area.

An example in which the power consumptions WI and WO are determined in accordance with the average brightness value YAG was described above, but there are no particular limitations on the method for determining the power consumption. The above method for determining the power consumptions WI and WO in accordance with the average brightness value YAG is a method based on controlling the emission brightnesses of the light source units in accordance with the average pixel value. To ensure that the power consumption is determined precisely, a method for determining the power consumption is preferably determined as appropriate on the basis of the method for controlling the emission brightnesses of the light source units.

An example in which the plurality of gradation values corresponding to the non-target area are corrected using a common coefficient (reduction rate) was described above, but as long as the total power consumption WS does not exceed the threshold THW, there are no particular limitations on the method for reducing the gradation values corresponding to the non-target area. The reduction rate does not have to be shared between the plurality of gradation values corresponding to the non-target area. Gradation values that are higher than the gradation value K (ε) at which the total power consumption WS does not exceed the threshold THW, among the plurality of gradation values corresponding to the non-target area, may be reduced to gradation values that are equal to or lower than the gradation value K (ε). More specifically, the gradation values that are higher than the gradation value K (ε), among the plurality of gradation values corresponding to the non-target area, may be replaced by the gradation value K (ε). According to this method, the area in which the brightness is reduced can be reduced in size. Moreover, variation in visibility in the area where the gradation values prior to the image processing do not exceed the gradation value K (ε) can be eliminated.

Second Embodiment

A second embodiment of the present invention will now be described. In the first embodiment, an example in which the brightness of the non-target area is reduced was described. However, when the target area is large, the power consumption of the display unit may not fall below the threshold after reducing the brightness of the non-target area. In this embodiment, an example enabling this problem to be solved will be described. Note that points (configurations and processing) that differ from the first embodiment will be described in detail below, while points that are identical to the first embodiment will be omitted.

Configuration of Display Apparatus

Figure 6:
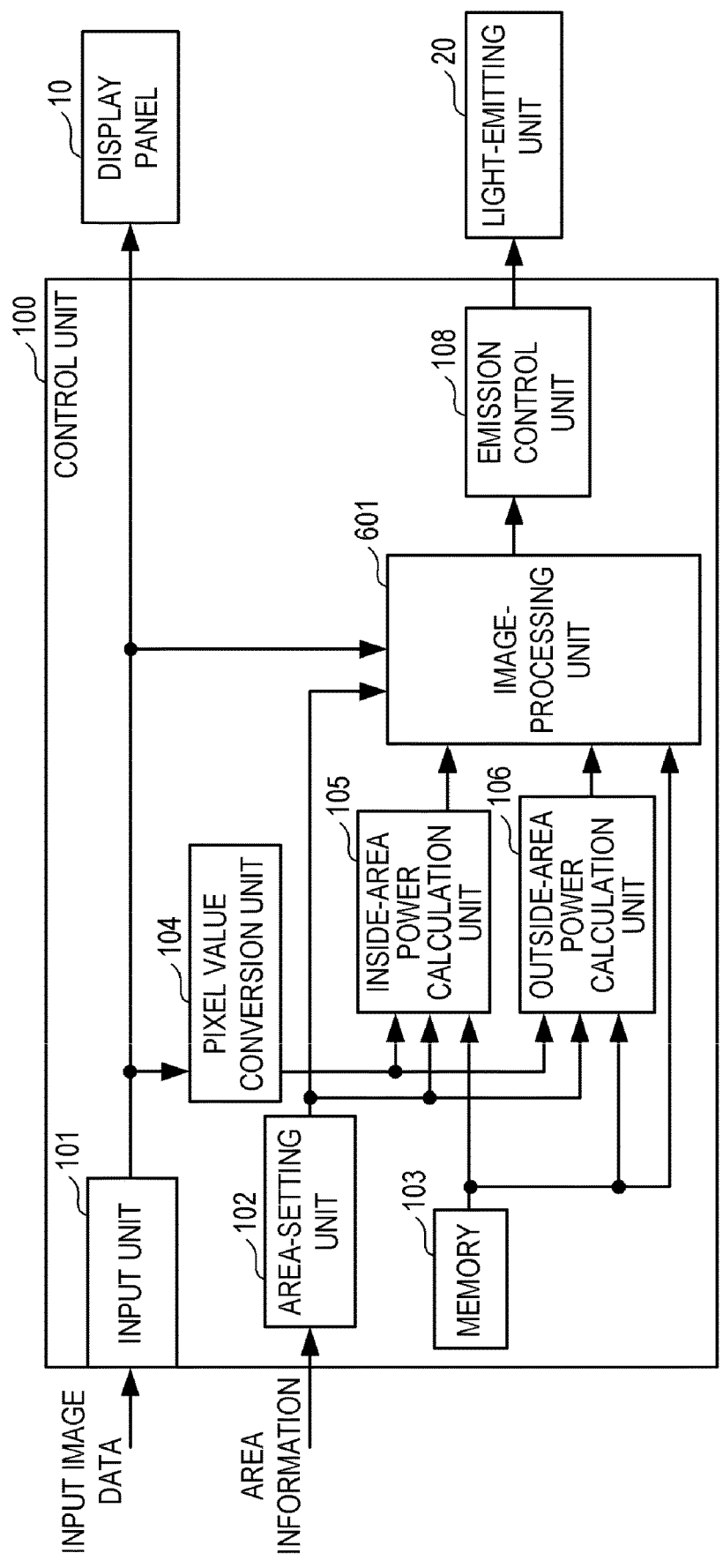
FIG. 6 is a block diagram showing an example configuration of a display apparatus according to a second embodiment.

FIG. 6 is a block diagram showing an example configuration of a display apparatus according to this embodiment. In FIG. 6, identical function units to the first embodiment (FIG. 1) have been allocated identical reference numerals to the first embodiment.

An image-processing unit 601 executes similar processing to the mage-processing unit 107 of the first embodiment. The image-processing unit 601 further executes control to reduce the upper limit value of the display brightness range of a part of the target area below the upper limit value of the display brightness range of another part of the target area. This control is executed to reduce the power consumption of the light-emitting unit 20 to or below the threshold in a case where the power consumption does not fall to or below the threshold after reducing the brightness (the pixel values) of the non-target area. The user is more likely to focus on or be interested in a central part of the target area than a peripheral part of the target area. In this embodiment, therefore, the image-processing unit 601 executes control to reduce the upper limit value of the display brightness range of the peripheral part of the target area below the upper limit value of the display brightness range of the central part of the target area. More specifically, the image-processing unit 601 reduces the brightness (the pixel values) of the peripheral part of the target area so that the power consumption is held at or below the threshold without modifying the brightness (the pixel values) of the central part of the target area. The peripheral part of the target area is an area including a predetermined number of pixels from the edge of the target area, for example.

For example, when the target area is set to extend over a plurality of BL control areas, the pixel values of the part of the input image data that is displayed in the BL control areas corresponding to the peripheral part of the target area are reduced below the pixel values of the part of the input image data that is displayed in the other BL control areas of the target area. As a result, the power consumption of the target area is reduced, leading to a reduction in the overall power consumption of the display apparatus.

Processing of Image-processing Unit 601

A specific example of the processing executed by the image-processing unit 601 will now be described. Here, of the plurality of RGB values (R values, G values, and B values) prior to the image processing, the RGB values corresponding to the target area will be described as "RGB values (Rpi, Gpi, Bpi)", while the RGB values corresponding to the non-target area will be described as "RGB values (Rpo, Gpo, Bpo)". Further, of the plurality of RGB values following the image processing, the RGB values corresponding to the target area will be described as "RGB values (Rqi, Gqi, Bqi)", while the RGB values corresponding to the non-target area will be described as "RGB values (Rqo, Gqo, Bqo)". Furthermore, the number of light source units corresponding to the target area will be described as "SI", and the number of light source units corresponding to the non-target area will be described as "SO". Moreover, the threshold of the power consumption will be described as "THW".

Step 4-1

The image-processing unit 601 calculates the sum of the power information WIS and the power information WOS as the total power consumption WS of all of the light source units provided in the light-emitting unit 20.

Step 4-2

When the total power consumption WS calculated in step 4-1 is equal to or lower than the threshold THW, the image-processing unit 601 calculates the RGB values following the image processing in a similar manner to the image-processing unit 107 of the first embodiment, using formulae 2 and 3.

When WS>THW and (WS−THW)≤WOS, the image-processing unit 601 calculates the RGB values following the image processing using formulae 4 to 6 described in the first embodiment.

When WS>THW and (WS−THW)>WOS, the image-processing unit 601 calculates the RGB values following the image processing using formulae 7 to 10, shown below. A value BI is an integer obtained by rounding up after the decimal point. According to formulae 7 to 10, the light source units are extinguished in all of the BL control areas corresponding to the non-target area and the number BI of BL control areas corresponding to the peripheral part of the target area. The BL control areas corresponding to a certain area are BL control areas including at least a part of the area, BL control areas including only the area, and so on.

$$(Rqo, Gqo, Bqo) = (0,0,0) \qquad \text{(formula 7)}$$

$$BI = (WIS - THW)/(WIS/SI) \qquad \text{(formula 8)}$$

With respect to the number BI of BL control areas corresponding to the peripheral part of the target area:

$$(Rqi, Gqi, Bqi) = (0,0,0) \qquad \text{(formula 9)}$$

With respect to the other BL control areas corresponding to the target area:

$$(Rqi, Gqi, Bqi) = (Rpi, Gpi, Bpi) \qquad \text{(formula 10)}$$

Display

Figure 7:
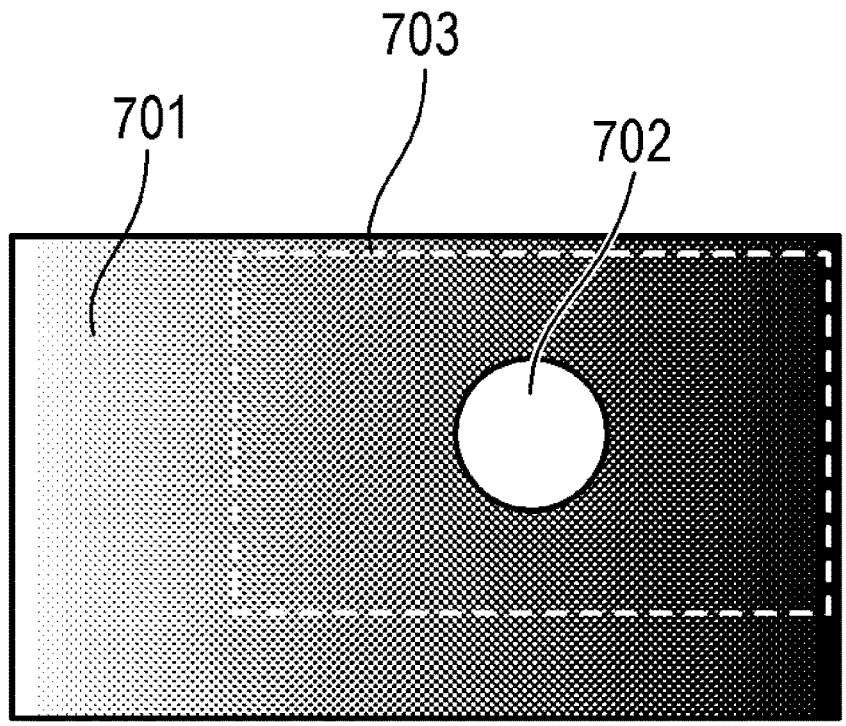
FIG. 7 is a schematic view showing an example of an input image according to the second embodiment.

A specific example of display by the display apparatus according to this embodiment will now be described. FIG. 7 is a schematic view showing an example of an input image.

Figure 8:
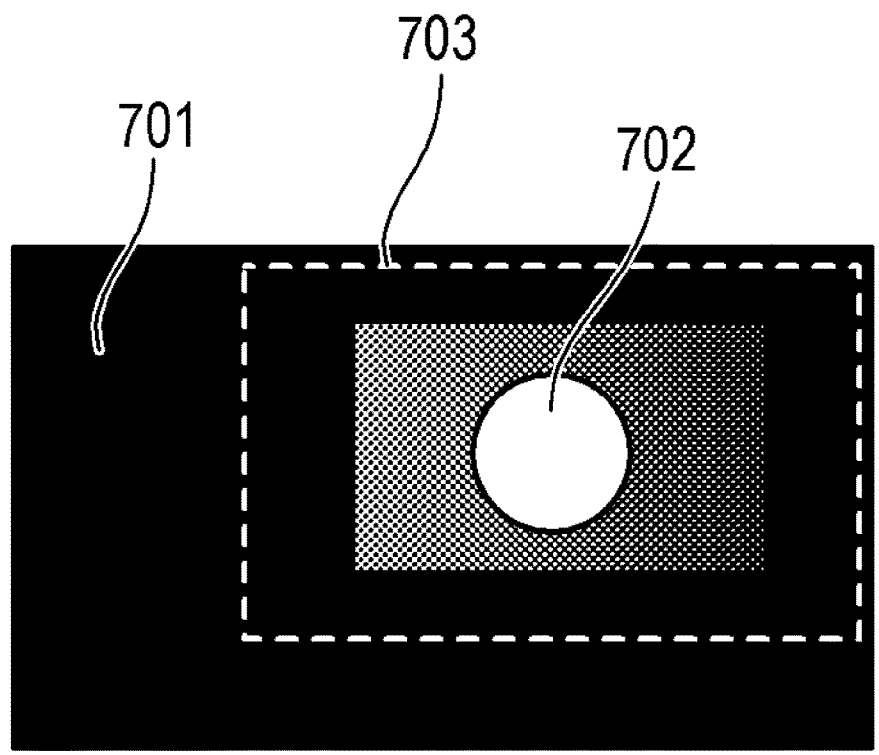
FIG. 8 is a schematic view showing an example of a display image according to the second embodiment.

In FIG. 7, a circular object 702 is depicted on a background 701, and a target area 703 including an area in which the circular object 702 is displayed has been specified. FIG. 8 is a schematic view showing an example of a display image. It is evident from FIG. 8 that the brightness of the central part of the target area 703 is equal to the brightness in FIG. 7 and the brightness of the circular object 702 is equal to that of FIG. 7. It is also evident that the brightness of the area outside the central part has been reduced from the brightness in FIG. 7 so that the total power consumption WS does not exceed the threshold THW.

According to this embodiment, as described above, when the power consumption of the display unit does not fall to or below the threshold after reducing the brightness of the non-target area, the upper limit value of the display brightness range of a part of the target area is additionally reduced so that the power consumption falls below the threshold. In so doing, the power consumption of the display unit can be reduced below the threshold more reliably, and an even more favorable image than that of the first embodiment can be displayed. More specifically, an intended adjustment result is obtained in at least a part of the target area during image quality adjustment in the target area. As a result, the user can specify an intended image quality adjustment more easily.

An example in which the light source units corresponding to the non-target area and the light source units corresponding to the peripheral part of the target area are extinguished when WS>THW and (WS−THW)>WOS was described above, but as long as the total power consumption WS does not exceed the threshold THW, these light source units may continue to emit light. As a result, the visibility of the display image in the area outside the central part of the target area can be improved.

Third Embodiment

A third embodiment of the present invention will now be described. In the first embodiment, an example in which the target area (the position and size of the target area) is specified by the user was described. In this embodiment, an example in which the user specifies a ratio of the size of the target area relative to the size of the screen will be described. Note that points (configurations and processing) that differ from the first embodiment will be described in detail below, while points that are identical to the first embodiment will be omitted.

Configuration of Display Apparatus

Figure 9:
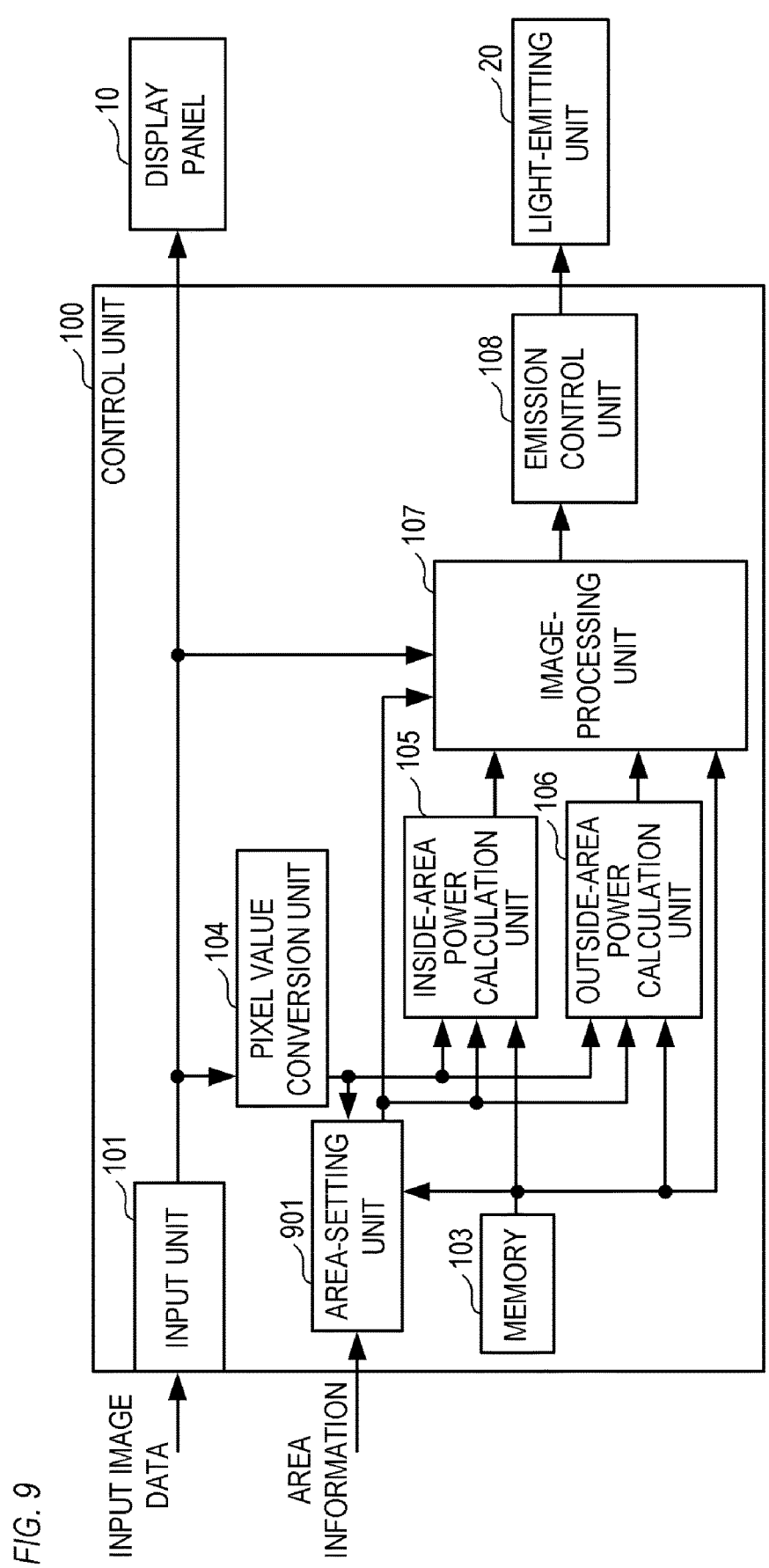
FIG. 9 is a block diagram showing an example configuration of a display apparatus according to a third embodiment.

FIG. 9 is a block diagram showing an example configuration of a display apparatus according to this embodiment. In FIG. 9, identical function units to the first embodiment (FIG. 1) have been allocated identical reference numerals to the first embodiment.

In this embodiment, the user specifies only the ratio of the size of the target area relative to the size of the screen such that area information indicating only this ratio is input into the display apparatus. Note that the user may specify only a ratio of the size of the non-target area relative to the size of the screen, or may specify both of the two ratios. Area information indicating only the ratio of the size of the non-target area relative to the size of the screen may be input into the display apparatus, or area information indicating both the two ratios may be input into the display apparatus.

A area-setting unit 901 sets the target area in the inside-area power calculation unit 105, the outside-area power calculation unit 106, and the image-processing unit 107 on the basis of the area information (the ratio of the size of the target area relative to the size of the screen) and the input image data. Note that the area-setting unit 901 may set the target area alone, the non-target area alone, or both the target area and the non-target area.

In this embodiment, the area-setting unit 901 converts the area information on the basis of the brightness values Y output from the pixel value conversion unit 104 and the table data recorded in the memory 103. More specifically, the area-setting unit 901 converts the area information indicating the ratio of the size of the target area relative to the size of the screen into area information (similar area information to the area information of the first embodiment) indicating the position and size of the target area. The area-setting unit 901 then outputs the converted area information to the inside-area power calculation unit 105, the outside-area power calculation unit 106, and the image-processing unit 107. Note that the method for setting the target area is not limited to the above method (converting and outputting the area information).

Processing of Area-setting Unit 901

A specific example of the processing executed by the area-setting unit 901 will now be described.

Step 5-1

The area-setting unit 901 calculates the average brightness value YAG of each BL control area (each divided areas) on the basis of the brightness values Y output from the pixel value conversion unit 104. The area-setting unit 901 then obtains the power consumption W corresponding to the calculated average brightness value YAG from the table data recorded in the memory 103. The processing of step 5-1 is executed on each BL control area.

Step 5-2

The area-setting unit 901 determines a number BM of BL control areas selected as the target area on the basis of the area information (the input area information) indicating the ratio of the size of the target area relative to the size of the screen. More specifically, as shown below in formula 11, the area-setting unit 901 obtains (calculates) the number BM by multiplying the ratio (a value of at least 0 and not larger than 1) by the total number of BL control areas. Note that when the value indicated by the input area information is a value (%) obtained by multiplying the ratio, which is at least 0 and not larger than 1, by 100, the right side of formula 11 is divided by 100.

$$BM = (\text{total number of } BL \text{ control areas}) \times (\text{value of input area information}) \quad \text{(formula 11)}$$

Step 5-3

The area-setting unit 901 selects the number BM of BL control areas determined in step 5-2 as the target area in order from the BL control area having the largest power consumption W obtained in step 5-1.

Step 5-4

The area-setting unit 901 generates information indicating the positions and sizes of the BL control areas (the number BM of BL control areas) selected in step 5-3 as converted area information. The area-setting unit 901 then outputs the converted area information to the inside-area power calculation unit 105, the outside-area power calculation unit 106, and the image-processing unit 107.

According to the processing of steps 5-1 to 5-4, the number BM of divided areas (BL control areas), among the plurality of divided areas constituting the screen, are set as the target area so that divided areas in which the gradation values of the input image data are large are set preferentially as the target area.

Display

Figure 10:
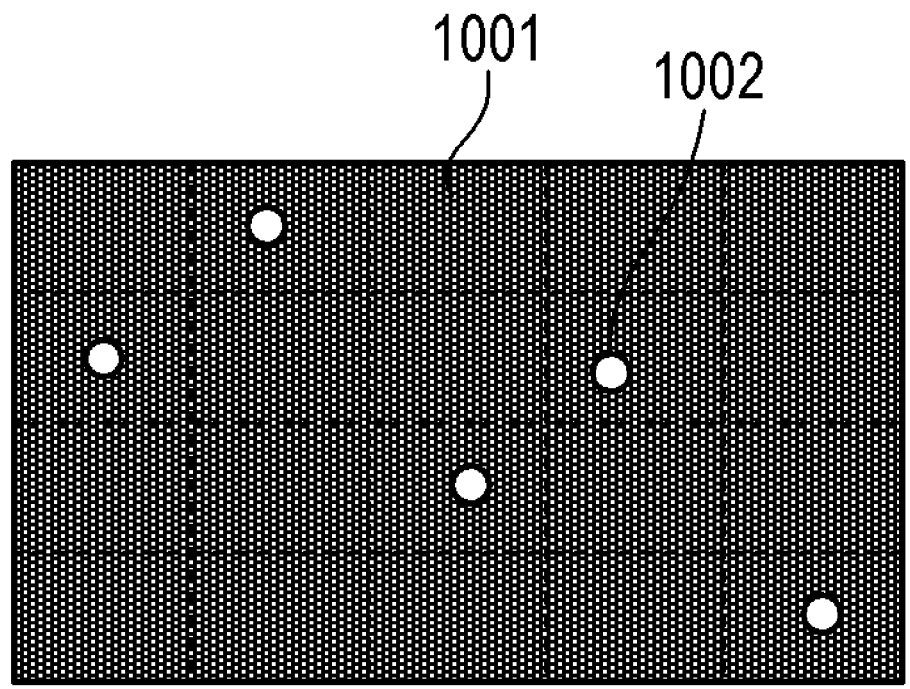
FIG. 10 is a schematic view showing an example of an input image according to the third embodiment.

A specific example of display by the display apparatus according to this embodiment will now be described. FIG. 10 is a schematic view showing an example of an input image. In FIG. 10, a plurality of circular objects 1002 are depicted on a background 1001. The brightness values Y (gradation values) of the circular objects 1002 are higher than the brightness value Y of the background 1001. In FIG. 10, a plurality of areas obtained by dividing the input image along dotted lines correspond respectively to the plurality of BL control areas (the plurality of divided areas).

Figure 11:
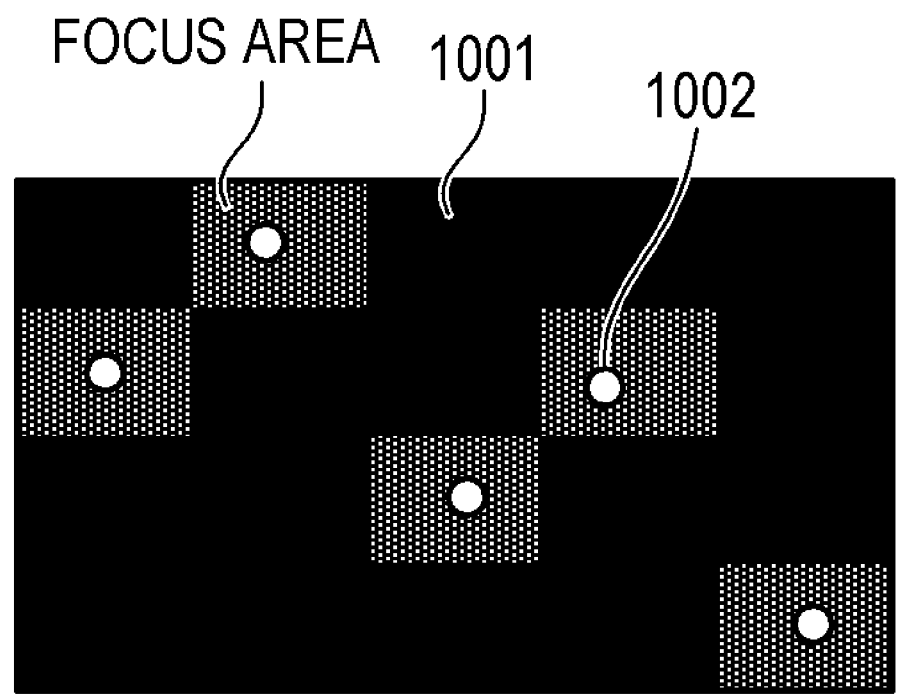
FIG. 11 is a schematic view showing an example of a display image according to the third embodiment.

FIG. 11 is a schematic view showing an example of a display image. It is assumed here that 25% has been specified as the ratio of the size of the target area relative to the size of the screen. In this case, using the method described above, the plurality of BL control areas corresponding respectively to the plurality of circular objects 1002 are set as target areas. As a result, as shown in FIG. 11, the circular objects 1002 (and respective peripheries thereof) are displayed at an identical brightness to the brightness in FIG. 10. Meanwhile, the brightness of the other areas is reduced from the brightness in FIG. 10 so that the total power consumption WS remains below the threshold THW.

According to this embodiment, as described above, the user specifies the ratio of the size of the target area relative to the size of the screen, whereupon the target area is set on the basis of this ratio. Control is then executed to reduce the upper limit value of the display brightness range of the non-target area below the upper limit value of the display brightness range of the target area so that the power consumption of the display unit does not exceed the predetermined power consumption. In so doing, an intended adjustment result is obtained at all times in relation to the area corresponding to the ratio, and as a result, the user can specify an intended image quality adjustment more easily. For example, the user can check the intended adjustment result without specifying the target area every time the input image is modified. This embodiment can be applied favorably to image quality adjustment of a large number of bright objects (stars or the like) scattered across the night sky.

Fourth Embodiment

A fourth embodiment of the present invention will now be described. In the first embodiment, an example of a display apparatus (a liquid crystal display apparatus or the like) having a light-emitting unit and a transmissive display panel was described. In this embodiment, an example of a display apparatus having a self-luminous display panel will be described. Note that points (configurations and processing) that differ from the first embodiment will be described in detail below, while points that are identical to the first embodiment will be omitted.

Configuration of Display Apparatus

Figure 12:
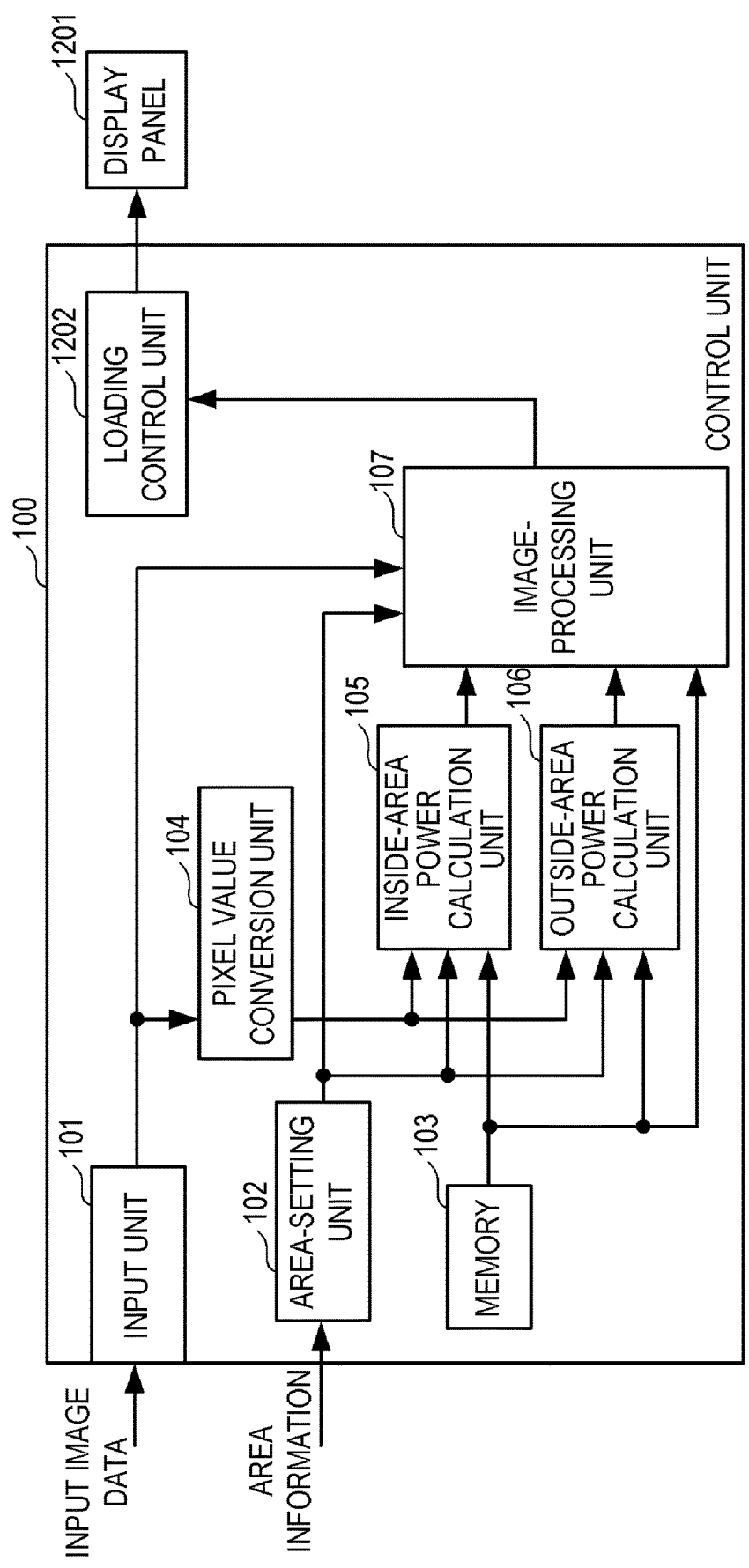
FIG. 12 is a block diagram showing an example configuration of a display apparatus according to a fourth embodiment.

FIG. 12 is a block diagram showing an example configuration of a display apparatus according to this embodiment. In FIG. 12, identical function units to the first embodiment (FIG. 1) have been allocated identical reference numerals to the first embodiment.

A display panel 1201 is a self-luminous display panel that displays an image on a screen by emitting light in accordance with image data output from a loading control unit 1202. The display panel 1201 is an organic EL display panel, a plasma display panel, or the like, for example.

The loading control unit 1202 outputs image data based on the corrected image data output from the image-processing unit 107 to the display panel 1201. Hence, in this embodiment, similarly to the first embodiment, the display unit is controlled on the basis of the corrected image data. In the first embodiment, the light-emitting unit 20 is controlled, whereas in this embodiment, the display panel 1201 is controlled. For example, when the power consumption of the display panel 1201 is equal to or smaller than the threshold during display corresponding to the corrected image data, the loading control unit 1202 outputs the corrected image data to the display panel 1201. When the power consumption of the display panel 1201 exceeds the threshold during display corresponding to the corrected image data, the loading control unit 1202 reduces the brightness of the corrected image data so that the power consumption of the display panel 1201 falls to or below the threshold. The loading control unit 1202 then outputs the image data reduced in brightness to the display panel 1201.

More specifically, the loading control unit 1202 implements processing on the corrected image data output from the image-processing unit 107 to reduce all of the gradation values (the overall brightness of the image) in accordance with an average gradation value (an average value of the gradation values) of the corrected image data. The loading control unit 1202 then outputs the image data subjected to this processing to the display panel 1201.

The memory 103 according to this embodiment, similarly to the memory 103 of the first embodiment, stores table data. Note, however, that the table data according to this embodiment indicate respective correspondence relationships between the emission brightnesses of display elements and the power consumptions of the display elements. More specifically, the table data according to this embodiment indicate respective correspondence relationships between the brightness values Y of the input image data and the power consumptions of the display elements.

Processing of Inside-area Power Calculation Unit 105

A specific example of the processing executed by the inside-area power calculation unit 105 according to this embodiment will now be described. Similarly to the inside-area power calculation unit 105 according to the first embodiment, the inside-area power calculation unit 105 according to this embodiment calculates and outputs the total power consumption WIS. In this embodiment, however, the total power consumption WIS is a total power consumption of all of the display elements corresponding to the target area.

Step 6-1

The inside-area power calculation unit 105 determines (specifies) a display element corresponding to the target area on the basis of the area information. The display element corresponding to the target area may also be referred to as a "display element disposed in the target area". Note that in step 6-1, a pixel (a pixel of the input image data) corresponding to the target area may be determined on the basis of the area information. The pixel corresponding to the target area may also be referred to as "a pixel displayed in the target area", "a pixel displayed by the display element corresponding to the target area", and so on.

Step 6-2

The inside-area power calculation unit 105 extracts the brightness value Y of a pixel corresponding to the display element specified in step 6-1 from the plurality of brightness values Y output from the pixel value conversion unit 104. When a plurality of display elements are specified in step 6-1, a plurality of brightness values Y corresponding respectively to the plurality of specified display elements are extracted.

Step 6-3

The inside-area power calculation unit 105 obtains the power consumption WI corresponding to the brightness value Y extracted in step 6-2 from the table data recorded in the memory 103. When a plurality of brightness values Y are extracted in step 6-2, a plurality of power consumptions WI corresponding respectively to the plurality of extracted brightness values Y are obtained.

Step 6-4

The inside-area power calculation unit 105 calculates the sum of all of the power consumptions WI obtained in step 6-3 as the total power consumption WIS, and outputs the total power consumption WIS to the image-processing unit 107.

Processing of Outside-area Power Calculation Unit 106

A specific example of the processing executed by the outside-area power calculation unit 106 according to this embodiment will now be described. Similarly to the outside-area power calculation unit 106 according to the first embodiment, the outside-area power calculation unit 106 according to this embodiment calculates and outputs the total power consumption WOS. In this embodiment, however, the total power consumption WOS is the total power consumption of all of the display elements corresponding to the non-target area.

Step 7-1

The outside-area power calculation unit 106 determines (specifies) a display element corresponding to the non-target area on the basis of the area information. The display element corresponding to the non-target area may also be referred to as a "display element disposed in the non-target area". Note that in step 7-1, a pixel (a pixel of the input image data) corresponding to the non-target area may be determined on the basis of the area information. The pixel corresponding to the non-target area may also be referred to as "a pixel displayed in the non-target area", "a pixel displayed by the display element corresponding to the non-target area", and so on.

Step 7-2

The outside-area power calculation unit 106 extracts the brightness value Y of a pixel corresponding to the display element specified in step 7-1 from the plurality of brightness values Y output from the pixel value conversion unit 104. When a plurality of display elements are specified in step 7-1, a plurality of brightness values Y corresponding respectively to the plurality of specified display elements are extracted.

Step 7-3

The outside-area power calculation unit 106 obtains the power consumption WO corresponding to the brightness value Y extracted in step 7-2 from the table data recorded in the memory 103. When a plurality of brightness values Y are extracted in step 7-2, a plurality of power consumptions WO corresponding respectively to the plurality of extracted brightness values Y are obtained.

Step 7-4

The outside-area power calculation unit 106 calculates the sum of all of the power consumptions WO obtained in step 7-3 as the total power consumption WOS, and outputs the total power consumption WOS to the image-processing unit 107.

Processing of Image-processing Unit 107

The image-processing unit 107 according to this embodiment, similarly to the image-processing unit 107 according to the first embodiment, implements image processing (reduction of the pixel values corresponding to the non-target area) based on the total power consumptions WIS and WOS and the table data recorded in the memory 103 on the input image data. The image-processing unit 107 according to this embodiment then outputs the image data subjected to the image processing to the loading control unit 1202. Note, however, that in this embodiment, the number SI is the number of display elements corresponding to the target area, while the number SO is the number of display elements corresponding to the non-target area. The total power consumption WS is the total power consumption of all of the display elements provided in the display panel 1201. Further, the value K (ε) denotes a maximum value of the brightness values Y associated with power consumptions below the power consumption ε in the table data recorded in the memory 103.

According to this embodiment, as described above, similar processing to the processing of the first embodiment is executed in the display apparatus having a self-luminous display panel. More specifically, control is executed to reduce the upper limit value of the display brightness range of the non-target area below the upper limit value of the display brightness range of the target area so that the power consumption of the display unit does not exceed the predetermined power consumption. In so doing, the power consumption of the display unit can be reduced below the threshold, and an image that is more favorable to the user can be displayed.

An example in which the processing of the first embodiment is applied to a display apparatus having a self-luminous display panel was described above, but the processing of the second and third embodiments may also be applied to a display apparatus having a self-luminous display panel.

Fifth Embodiment

A display apparatus according to a fifth embodiment is a transmissive display apparatus that displays an image by transmitting light through a display panel on the basis of image data, the light being emitted from a backlight unit having a plurality of light sources that are capable of emitting light individually.

Figure 13:
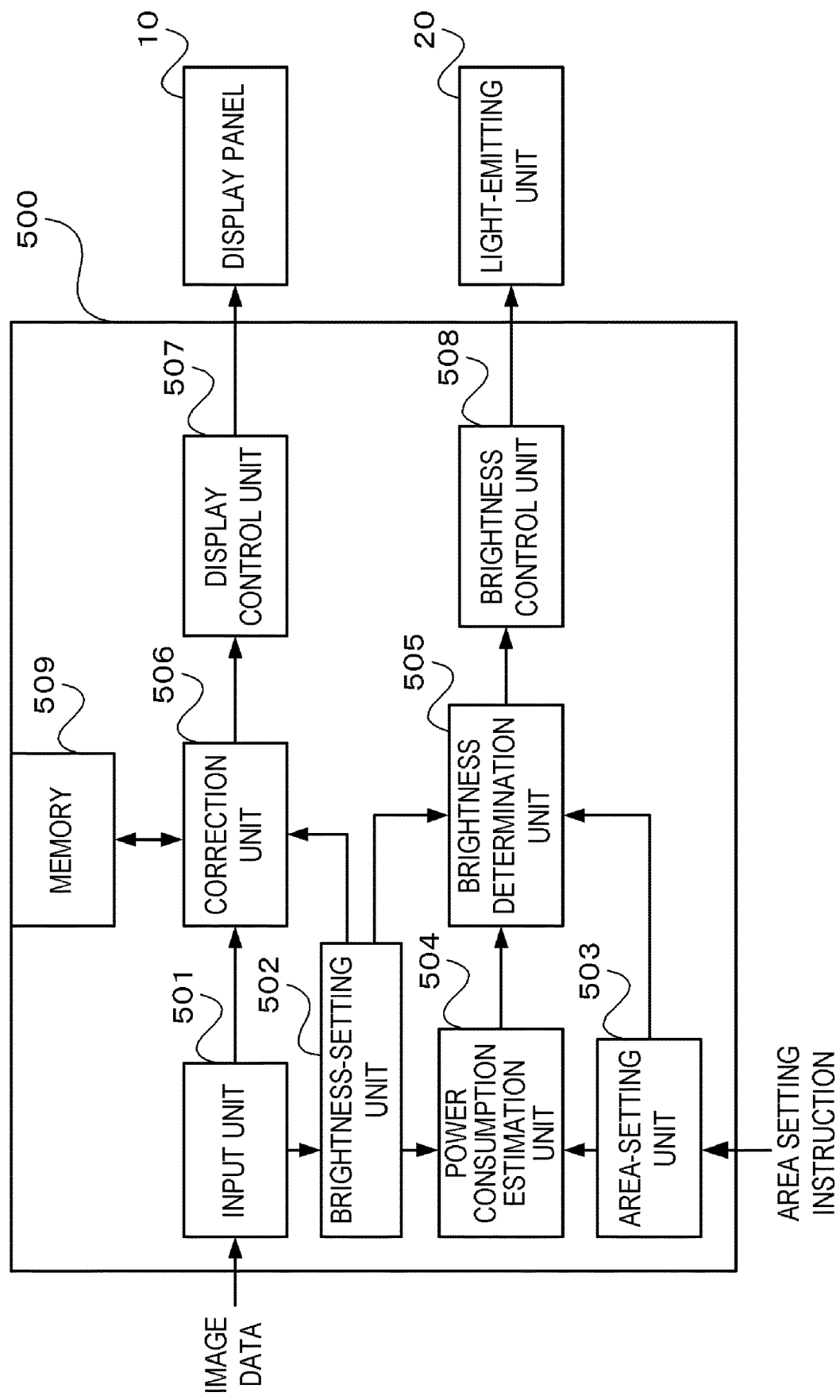
FIG. 13 is a block diagram showing an example configuration of a display apparatus according to a fifth embodiment.

FIG. 13 is a block diagram showing function blocks of the display apparatus. The display apparatus includes the display panel 10, the light-emitting unit 20, and a control unit 500. The control unit 500 includes an input unit 501, a brightness-setting unit 502, an area-setting unit 503, a power consumption estimation unit 504, a brightness determination unit 505, a correction unit 506, a display control unit 507, and a brightness control unit 508.

The control unit 500 sets the emission brightness of each light source on the basis of the image data and determines whether or not the power consumption of the light-emitting unit will exceed a predetermined threshold when the light-emitting unit is driven at the set emission brightnesses. Further, after determining that the power consumption of the light-emitting unit will exceed the predetermined threshold when the light-emitting unit is driven at the set emission brightnesses, the control unit 500 determines an emission brightness to be used to control each light source by executing brightness correction processing for reducing the set emission brightnesses. The control unit 500 sets a target area on the screen of the display panel 10. Then, when executing the brightness correction processing, the control unit 500 does not subject light sources corresponding to the target area to the brightness correction processing.

The input unit 501 is an interface on which to input the image data. The image data are assumed to be data in which a gradation value (a gradation level) for each of three colors, namely red, green, and blue (R, G, B), is specified in relation to each of a plurality of pixels disposed in a matrix. Note that the colors for which gradation values are specified are not limited to the above colors. The number of colors for which gradation values are specified is not limited to three. The input unit 501 outputs the image data to the brightness-setting unit 502 and the correction unit 506.

The brightness-setting unit 502 sets an emission brightness p (x, y) for each light source (each light source unit) of the light-emitting unit 20 on the basis of a brightness level of the image data corresponding to each light source. Here, (x, y) denotes coordinates of the light source in the light-emitting unit 20. It is assumed that emission by each of the light sources is controlled by controlling a pulse width of a current applied to the light source. In this case, the emission brightness p is assumed to be a value obtained by normalizing a ratio (a duty ratio) of an illumination period within a predetermined control period so that a maximum value of the ratio is 1. The predetermined control period may be a frame period in which the display apparatus displays an image, or a sub-frame period obtained by dividing the frame period.

Note that the emission brightness p may be any parameter corresponding to the emission brightness of the light source. For example, the emission brightness p may denote an absolute value of the emission brightness of each light source in a nit or $cd/m^2$ unit system. The emission brightness p may also be a value indicating a relative value of the emission brightness of each light source relative to a set maximum emission brightness. The emission brightness p may also be a value indicating a drive power of each light source.

The brightness-setting unit 502 sets the emission brightness p in accordance with a brightness level of a part of the image data displayed in an area of the display panel 10 that corresponds to each light source. The brightness level is constituted by, for example, the respective R, B gradation values of the image data or the brightness value Y obtained from the respective R, B gradation values. The brightness-setting unit 502 sets the emission brightness p of each light source on the basis of a maximum value of the brightness level of the part of the image data displayed in the area of the display panel 10 that corresponds to the relevant light source.

FIGS. 14A and 14B are schematic views respectively showing the input image data and the emission brightness of each light source, set on the basis of the image data. FIG. 14A is a schematic view showing the image data. Dotted lines in the figure indicate correspondence relationships between the light sources of the light-emitting unit 20 and the image data, and are not dotted lines depicted on the image data. The image data are data representing an image in which objects A and B having a high brightness level are disposed on a background image having a low brightness level. The light-emitting unit 20 has a plurality of light sources disposed in a matrix, the plurality of light sources including 8 light sources in the horizontal direction×6 light sources in the vertical direction.

FIG. 14B is a schematic view showing the emission brightness p of each light source, set on the basis of the image data. Numerical values represent PWM duty ratios. The brightness-setting unit 502 sets the emission brightness of each of the light sources in which either of the objects A and B having a high brightness level is included in the corresponding area at 1. Further, the brightness-setting unit 502 sets the emission brightness of each of the light sources in which only the background image having a low brightness level is included in the corresponding area at 0.3.

The brightness-setting unit 502 outputs information indicating the set emission brightness p of each light source to the power consumption estimation unit 504, the brightness determination unit 505, and the correction unit 506.

In response to an area setting instruction, the area-setting unit 503 sets, on the screen of the display panel 10, a specific area in which processing (to be described below) to correct the emission brightness on the basis of the power consumption is not to be implemented. In the specific area, the processing to correct the emission brightness is not implemented, and therefore variation in the display brightness caused by variation in the image data can be suppressed. Hence, by specifying in advance an area on which the user wishes to focus or an area in which the effect of variation in the display brightness is thought to be large, the effects of the correction processing can be reduced.

It is assumed that the user inputs the area setting instruction by operating a GUI displayed on the screen and specifying the instruction. Alternatively, the area-setting unit 503 may obtain the image data and set an area of the image data that satisfies a predetermined condition as the specific area. For example, the area-setting unit 503 may set an area in which an average brightness level of the image data equals or exceeds a predetermined brightness level as the specific area. Further, the area-setting unit 503 may set an area of the image data that includes at least a predetermined number of pixels having a brightness level that equals or exceeds a predetermined brightness level as the specific area.

Figure 15A:
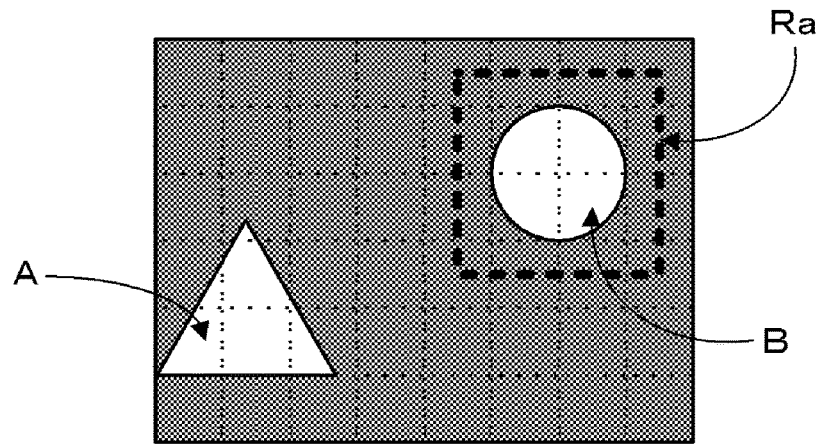
FIG. 15A is a schematic view showing an example of a specific area according to the fifth embodiment.
Figure 15B:
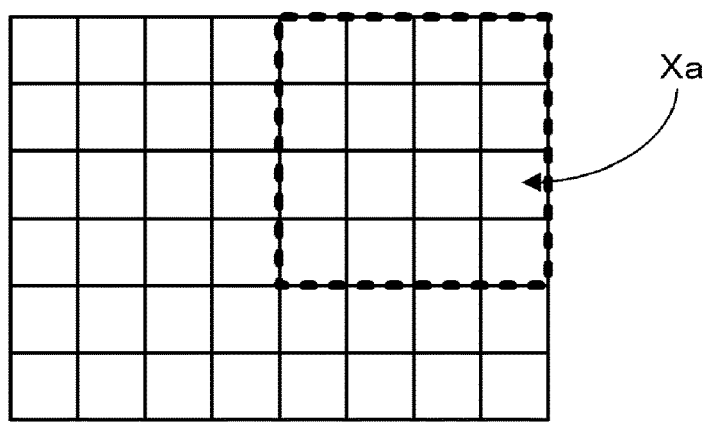
FIGS. 15B and 15C are schematic views showing examples of specified light sources according to the fifth embodiment.
Figure 15C:
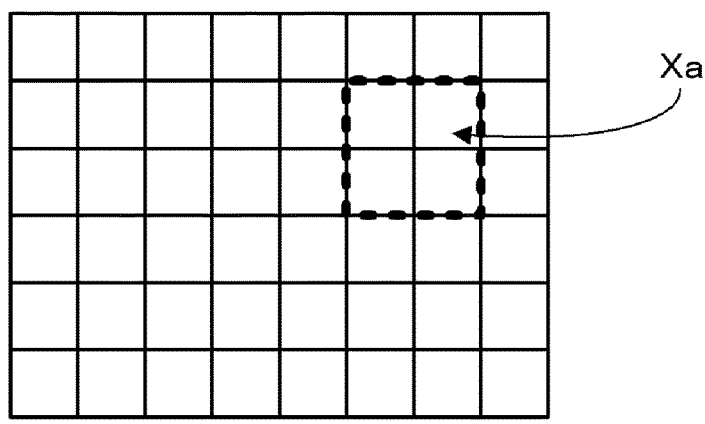

The area-setting unit 503 specifies a light source corresponding to the specific area. FIGS. 15A to 15C are schematic views showing the specific area on the screen of the display panel 10 and light sources (specified light sources) of the light-emitting unit 20 that correspond to the specific area. FIG. 15A is a schematic view showing the specific area on the screen of the display panel 10. It is assumed, for example, that the user specifies an area Ra including an object B as the specific area by operating a GUI while checking an image that is displayed on the screen on the basis of the image data.

FIG. 15B is a schematic view showing light sources Xa corresponding to the specific area Ra. The specific area Ra is not always specified so as to correspond to a light source area (an area corresponding to a light source) of the light-emitting unit 20. It is assumed that the area-setting unit 503 determines light sources in which at least a part of the light source area overlaps at least a part of the specific area Ra as the specified light sources. Note that the area-setting unit 503 may set only light sources in which the entire light source area overlaps at least a part of the specific area Ra as the specified light sources. FIG. 15C is a schematic view showing the specified light sources Xa corresponding to the specific area Ra in a case where only light sources in which the entire light source area overlaps at least a part of the specific area Ra are set as the specified light sources. In this case, the number of light sources (light sources that are not specified light sources) subjected to emission brightness correction on the basis of the power consumption increases, and therefore a reduction in the emission brightness of the light sources other than the specified light sources due to the correction processing can be suppressed. In other words, a reduction in emission brightness per light source can be reduced.

The area-setting unit 503 outputs information indicating the specified light sources to the power consumption estimation unit 504 and the brightness determination unit 505.

The power consumption estimation unit 504 estimates the power consumption WIS of the specified light sources corresponding to the specific area and the power consumption WOS of the light sources corresponding to the area other than the specific area in a case where the respective light sources are controlled using the emission brightnesses set by the brightness-setting unit 502. The power consumption estimation unit 504 then determines whether or not a sum of the power consumption WIS and the power consumption WOS is larger than a threshold Th.

As noted above, the emission brightness p is indicated by a duty ratio. The duty ratio is commensurate with a current application time, and corresponds to the power consumption of the light source. In this embodiment, the power consumption estimation unit 504 determines whether or not the sum of the power consumption WIS and the power consumption WOS is larger than the threshold Th on the basis of whether or not a sum of the emission brightnesses p (duty ratios) is larger than a predetermined threshold Th, which is indicated by a duty ratio.

Here, the emission brightnesses set in the specified light sources are set as emission brightnesses pi. Further, the emission brightnesses set in the light sources that are not specified light sources are set as emission brightnesses po. The power consumption WIS and the power consumption WOS are respectively determined from formulae 12-1 and 12-2, shown below.

[Math. 1]

$$WIS = \sum_{(x,y)} pi(x, y) \quad \text{(formula 12-1)}$$

$$WOS = \sum_{(x,y)} po(x, y) \quad \text{(formula 12-2)}$$

When the sum of the power consumption WIS and the power consumption WOS is determined to be larger than the threshold Th, the power consumption estimation unit 504 calculates, on the basis of the power consumption WIS, the power consumption WOS, and the threshold Th, a coefficient $\alpha$ to be used to correct the emission brightnesses of the light sources that are not specified light sources. The coefficient $\alpha$ is set so that when the specified light sources are controlled using the set emission brightnesses and the light sources that are not specified light sources are controlled using the corrected emission brightnesses, the power consumption of the light-emitting unit 20 does not exceed the threshold Th. For example, in a case where the coefficient $\alpha$ is determined so that the power consumption (the total value of the duty ratios) of the light-emitting unit 20 equals the threshold Th, the coefficient $\alpha$ is determined using formula 13, shown below.

$$\alpha = (Th - WIS)/WOS \quad \text{(formula 13)}$$

When the brightness-setting unit 502 sets the emission brightness of each of the light sources as shown in FIG. 14B and the threshold Th is set at 15, the sum of the power consumption WIS and the power consumption WOS is determined to be larger than the threshold Th. Accordingly, the coefficient $\alpha$ is calculated to 0.51 ($\approx(15.0-7.6)/14.5$).

The power consumption estimation unit 504 outputs a determination result indicating whether or not the sum of the power consumption WIS and the power consumption WOS is larger than the threshold Th to the brightness determination unit 505. Further, when the sum of the power consumption WIS and the power consumption WOS is determined to be larger than the threshold Th, the power consumption estimation unit 504 outputs the calculated coefficient $\alpha$ to the brightness determination unit 505.

The brightness determination unit 505 determines an emission brightness to be used to control the light-emitting unit 20 by correcting the set emission brightness of each light source on the basis of the coefficient $\alpha$ and the determination result obtained from the power consumption estimation unit 504. When the power consumption estimation unit 504 determines that the sum of the power consumption WIS and the power consumption WOS does not exceed the threshold Th, the brightness determination unit 505 outputs the emission brightnesses of the light sources obtained from the brightness-setting unit 502 to the brightness control unit 508.

Further, when the power consumption estimation unit 504 determines that the sum of the power consumption WIS and the power consumption WOS is larger than the threshold Th, the brightness determination unit 505 corrects the emission brightness of each light source that is not a specified light source, among the emission brightnesses of the respective light sources obtained from the brightness-setting unit 502, using the coefficient $\alpha$.

Figure 16:
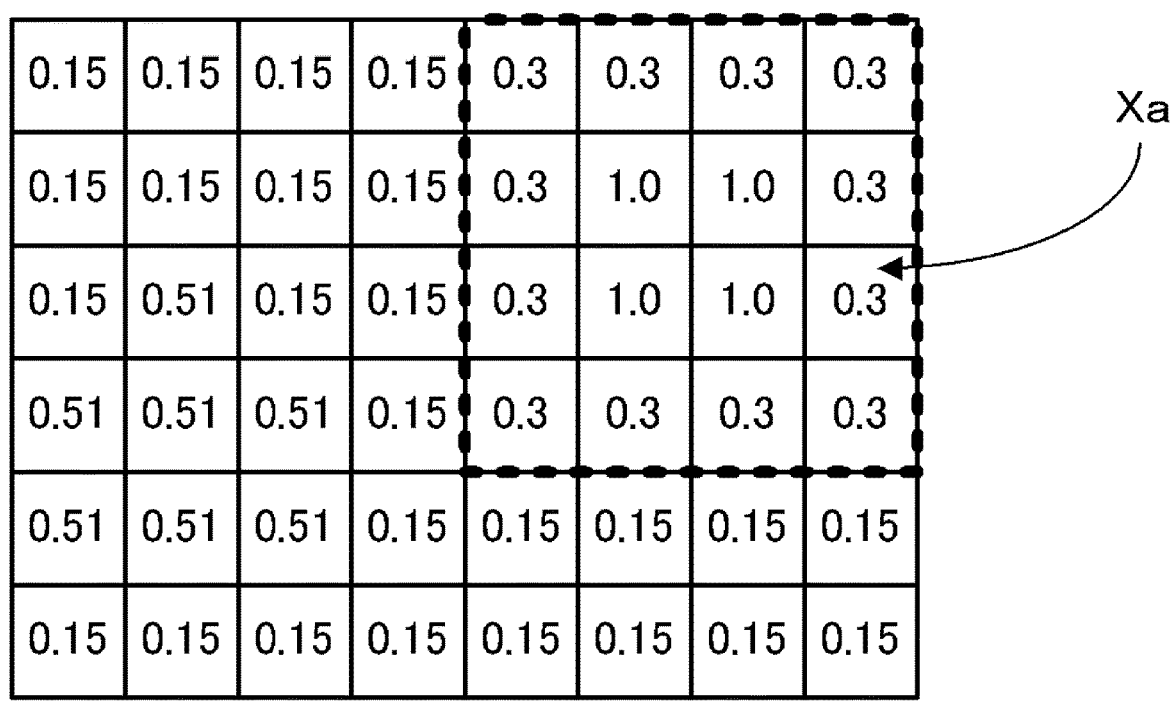
FIG. 16 is a schematic view showing an example of corrected emission brightnesses of the respective light sources according to the fifth embodiment.

FIG. 16 is a schematic view showing the emission brightness of each light source after being corrected by the brightness determination unit 505. The emission brightnesses of the light sources other than the specified light sources Xa are reduced in comparison with the emission brightnesses shown in FIG. 14B. More specifically, of the light sources other than the specified light sources Xa, the emission brightnesses of the light sources in which the emission brightness (the duty ratio) was set at 1 have been corrected to 0.51, and the emission brightnesses of the light sources in which the emission brightness (the duty ratio) was set at 0.3 have been corrected to 0.15. Meanwhile, the emission brightnesses of the specified light sources Xa do not vary from the values set by the brightness-setting unit 502. At this time, when the total power consumption is calculated on the basis of the emission brightnesses determined by the brightness determination unit 505, the total power consumption does not exceed the threshold Th.

The brightness control unit 508 controls the brightness of each light source using the emission brightnesses of the respective light sources, determined by the brightness determination unit 505. In a case where the emission brightness is denoted by a duty ratio, the brightness control unit 508 controls the respective light sources by PWM-driving the light sources at the duty ratios indicating the emission brightnesses.

The correction unit 506 corrects the image data on the basis of the obtained emission brightnesses of the respective light sources (the emission brightnesses set by the brightness-setting unit 502). The correction unit 506 estimates an intensity distribution of the light emitted onto the display panel 10 when the light-emitting unit 20 emits light at the emission brightness set for each light source. The correction unit 506 obtains from the memory a distribution function indicating a distribution of the light emitted onto the display panel 10 when a certain light source emits light. The correction unit 506 then uses the emission brightnesses of the respective light sources and the distribution function to estimate a light intensity distribution formed when the light emitted from the respective light sources is combined on a rear surface of the display panel 10. Note that the correction unit 506 may use the emission brightnesses determined by the brightness determination unit 505 instead of the emission brightnesses set by the brightness-setting unit 502.

The correction unit 506 executes processing on each pixel of the image data to obtain a corrected pixel value by dividing each pixel value of the image data by the intensity of the light emitted onto a position of the display panel 10 corresponding to the relevant pixel. The brightness (intensity) of the light emitted onto the rear surface of the display panel 10 when each light source of the light-emitting unit 20 is driven by a predetermined duty ratio is set as a reference intensity Lt. The intensity of the light emitted in a position (x, y) of the display panel 10 corresponding to a pixel (x, y) is set at L (x, y). The correction unit 506 obtains the corrected pixel value by multiplying Lt/L (x, y) by the pixel value of the image data that corresponds to the position (x, y) of the display panel 10. It is assumed that the intensity of the light that is emitted when the light sources are driven at the emission brightnesses set by the brightness-setting unit 502 on the basis of the image data is reduced from the reference intensity Lt. The correction unit 506 corrects the image data in order to suppress the effects of this reduction. The correction unit 506 then outputs the corrected image data to the display control unit 507.

The display control unit 507 controls a transmittance of the display panel 10 on the basis of the image data obtained from the correction unit 506. When the image data are corrected by the correction unit 506 on the basis of the emission brightnesses of the respective light sources of the light-emitting unit 20, the brightness displayed in a plurality of areas in which the image data prior to correction have equal pixel values remains substantially identical even when the plurality of light sources corresponding to these areas are controlled using different emission brightnesses.

Figure 17:
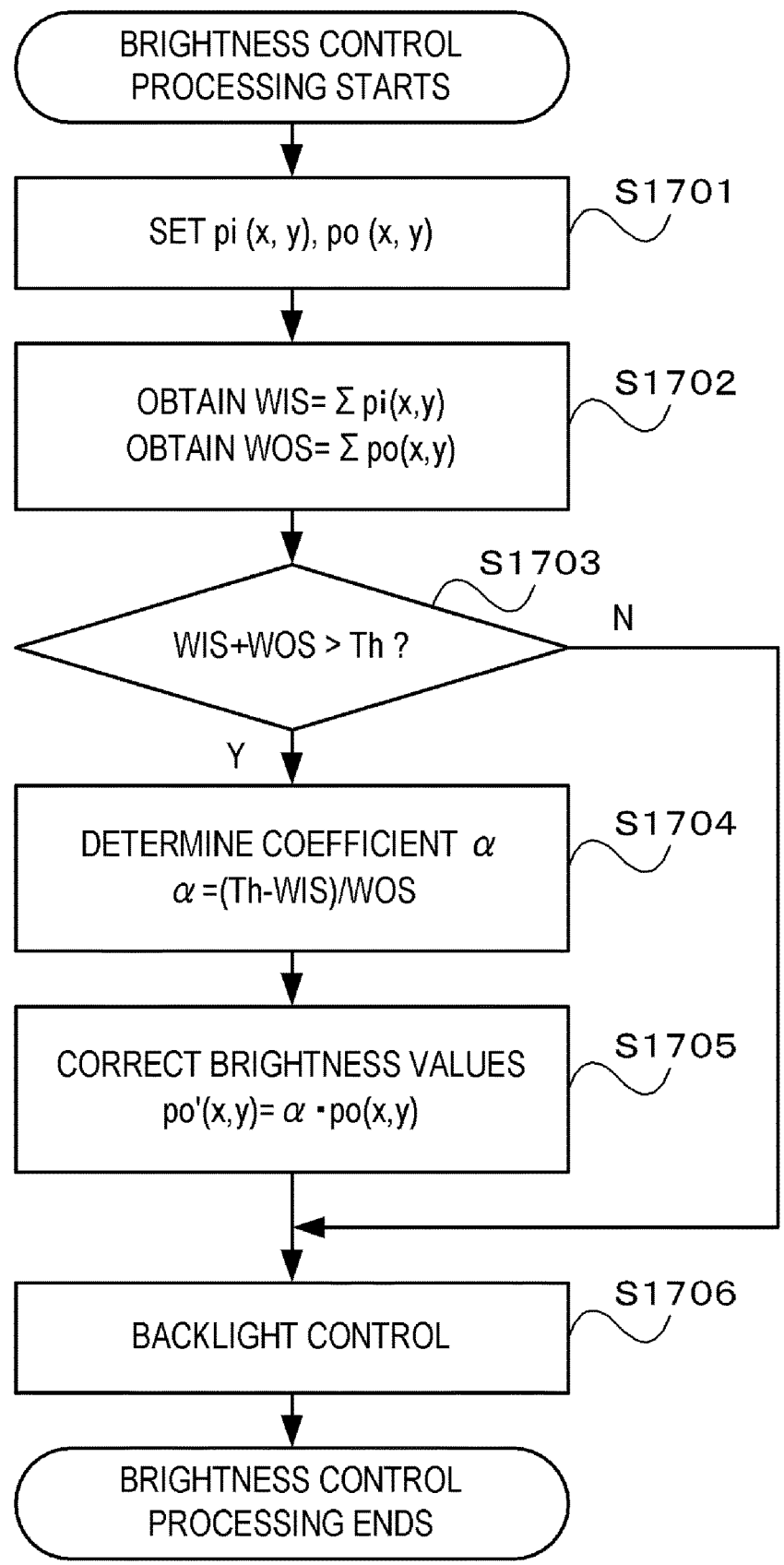
FIG. 17 is a flowchart showing an example of an emission brightness control flow according to the fifth embodiment.

FIG. 17 is a schematic view showing an emission brightness control flow according to this embodiment.

First, in step S1701, the brightness-setting unit 502 sets the emission brightness p (x, y) of each light source of the light-emitting unit 20 on the basis of the brightness level of the image data corresponding to each light source. It is assumed here that a specific area has been set by the area-setting unit 503, and therefore, in the processing of step S1701, the emission brightnesses pi (x, y) and the emission brightnesses po (x, y) are set.

Next, in step S1702, the power consumption estimation unit 504 calculates the power consumptions WIS and WOS on the basis of the emission brightnesses pi (x, y) and po (x, y) set in step S1701. The power consumptions WIS and WOS are calculated using formulae 12-1 and 12-2, illustrated above.

In step S1703, the power consumption estimation unit 504 determines from the power consumptions WIS and WOS calculated in step S1702 whether or not the sum of the power consumption WIS and the power consumption WOS is larger than the threshold Th. When the sum of the power consumption WIS and the power consumption WOS is determined to be larger than the threshold Th, the processing advances to step S1704, and when the sum is determined to be equal to or smaller than the threshold Th, the processing advances to step S1706.

In step S1704, the power consumption estimation unit 504 calculates the coefficient α on the basis of the power consumptions WIS and WOS calculated in step S1702 and the threshold Th. The coefficient α is calculated using formula 13, illustrated above.

Next, in step S1705, the brightness determination unit 505 corrects the emission brightnesses po (x, y) set in step S1701 with respect to the light sources that are not specified light sources to emission brightnesses po' (x, y) by multiplying the emission brightnesses po (x, y) respectively by the coefficient α calculated in step S1704. The processing then advances to step S1706.

In step S1706, the brightness control unit 508 controls the brightness of each light source using the emission brightnesses of the respective light sources determined by the brightness determination unit 505. When the sum of the power consumption WIS and the power consumption WOS is determined to be equal to or smaller than the threshold Th in step S1703, the brightnesses of the respective light sources are controlled using identical emission brightnesses to the emission brightnesses p (x, y) of the respective light sources set in step S1701. When the sum of the power consumption WIS and the power consumption WOS is determined to be larger than the threshold Th in step S1703, the brightnesses are controlled using identical emission brightnesses to the emission brightnesses pi (x, y) set in step S1701 with respect to the specified light sources, and with respect to the light sources that are not specified light sources, the brightnesses are controlled using the emission brightnesses po' (x, y) obtained in step S1705.

Figures 18A, 18B:
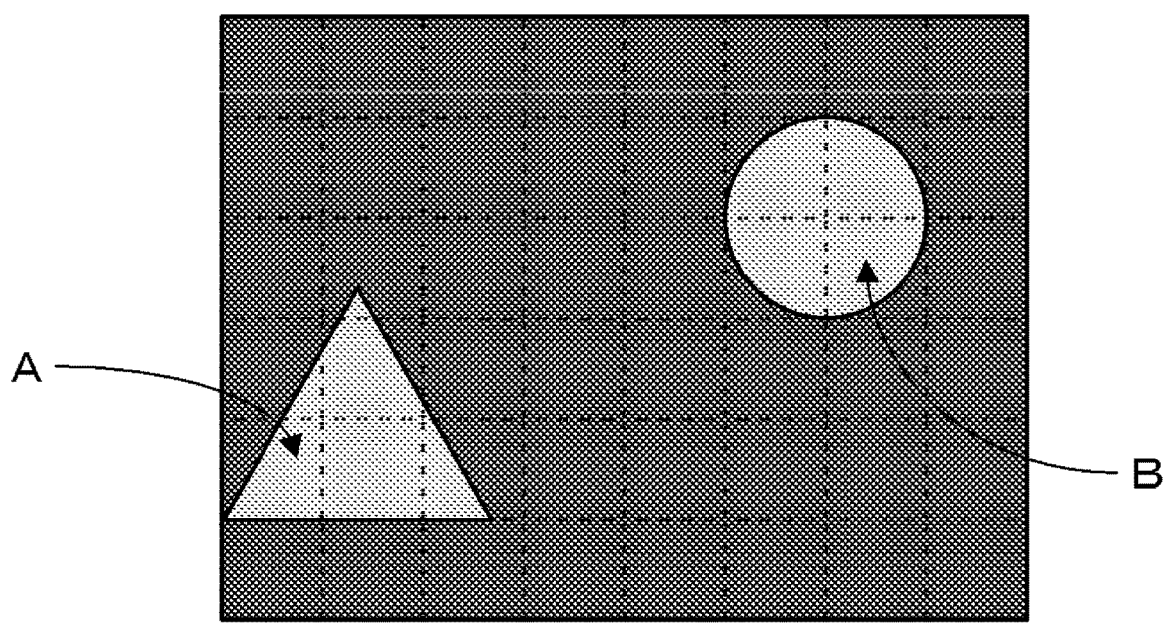
FIG. 18A is a schematic view showing an example of emission brightnesses of respective light sources according to a comparative example.
FIG. 18B is a schematic view showing an example of a display image according to the comparative example.
Figure 19:
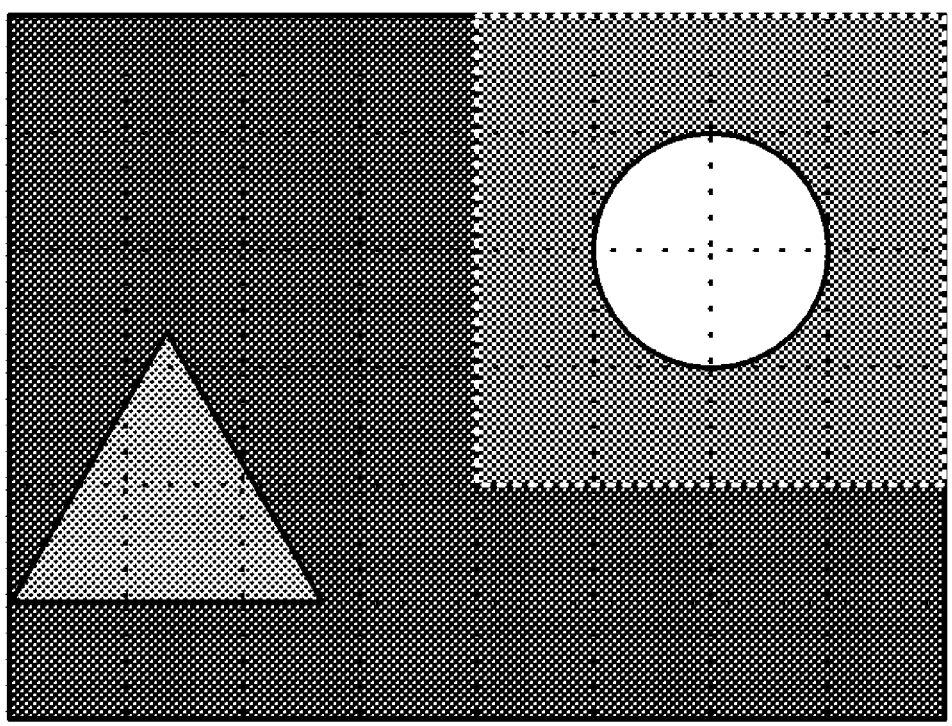
FIG. 19 is a schematic view showing an example of a display image according to the fifth embodiment.

FIGS. 18A, 18B, and 19 are schematic views showing effects obtained when the control according to this embodiment is executed. Image data to be displayed are assumed to be similar to the image data shown in FIG. 14A. Further, the emission brightnesses of the respective light sources set by the brightness-setting unit 502 on the basis of the image data shown in FIG. 14A are assumed to be the emission brightnesses shown in FIG. 14B. When the threshold Th is set at 15, the total power consumption W in a case where the light-emitting unit 20 is driven at the set emission brightnesses of the respective light sources is 22.1, which is larger than the threshold Th.

To ensure that the power consumption of the light-emitting unit 20 does not exceed the threshold Th in a case where the control of this embodiment is not executed, light emission by the respective light sources is controlled using emission brightnesses obtained by multiplying Th/W by the emission brightnesses of the respective light sources set by the brightness-setting unit 502. FIGS. 18A and 18B are schematic views showing a comparative example in which the control of this embodiment is not executed. FIG. 18A is a schematic view showing the emission brightnesses used to control the light sources in a case where the control of this embodiment is not executed so that all of the light sources are subjected to adjustment processing. The emission brightnesses of all of the light sources are lower than the set emission brightnesses shown in FIG. 14B. FIG. 18B is a schematic view showing an image displayed on the display panel 10 in a case where the light sources are controlled using the emission brightnesses shown in FIG. 18A. The light sources are controlled uniformly using lower emission brightnesses than the emission brightnesses set on the basis of the image data, and as a result, the entire displayed image is darker than when processing for adjusting the emission brightness is not implemented.

FIG. 19 is a schematic view showing an image displayed on the display panel 10 in a case where the control of this embodiment is executed. As a result of executing the control of this embodiment, processing for adjusting the emission brightness is not executed on the specified light sources Xa. Hence, in the area (the target area Ra) corresponding to the specified light sources Xa, an image is displayed at an equal brightness to the brightness displayed when the light-emitting unit 20 is controlled using the set emission brightnesses pi. The light sources that are not the specified light sources Xa, meanwhile, are controlled using the emission brightnesses po', which are lower than the set emission brightnesses po. Hence, in the area corresponding to the light sources that are not the specified light sources Xa, an image is displayed at a lower brightness than the brightness displayed when the light-emitting unit 20 is controlled using the set emission brightnesses po.

The processing for adjusting the emission brightness of the light source is processing for controlling the upper limit value of the display brightness in the area corresponding to the light source. By executing the processing (reduction processing) for adjusting the emission brightness of the light source on the basis of the power consumption, the upper limit value of the brightness that can be displayed in the area corresponding to the light source decreases. For example, an emission brightness corresponding to a maximum duty ratio that can be taken by the light source is set in a light source corresponding to a certain area that includes a white area. When the emission brightness of the light source is reduced by executing adjustment processing on the basis of the power consumption, the display brightness of the white area decreases. The display brightness of the white area corresponds to the upper limit value of the brightness that can be displayed in the area including the white area.

According to this embodiment, variation in the display brightness of a specified area (the target area) can be suppressed by not subjecting the light sources (the specified light sources) corresponding to the target area to adjustment processing based on the power consumption.

Hence, an area including a location on which the user wishes to focus can be specified in advance as a target area when the user performs an editing operation on the image data, for example, and as a result, the effect of the power consumption on the display brightness can be reduced, allowing the user to perform the operation with stability.

Sixth Embodiment

In the display apparatuses according to the first to fifth embodiments, control is executed to specify a partial area of the input image data as an area of interest and to exclude the backlight units corresponding to the specified area from brightness adjustment processing based on the power consumption. Further, in the case of a self-luminous display apparatus, control is executed to exclude the pixels belonging to the area from adjustment processing based on the power consumption.

In a sixth embodiment, when a plurality of pieces of image data are displayed on a single screen, variation in the display brightness of a target area is suppressed by excluding an area corresponding to image data specified by the user from adjustment processing based on the power consumption.

Figure 20:
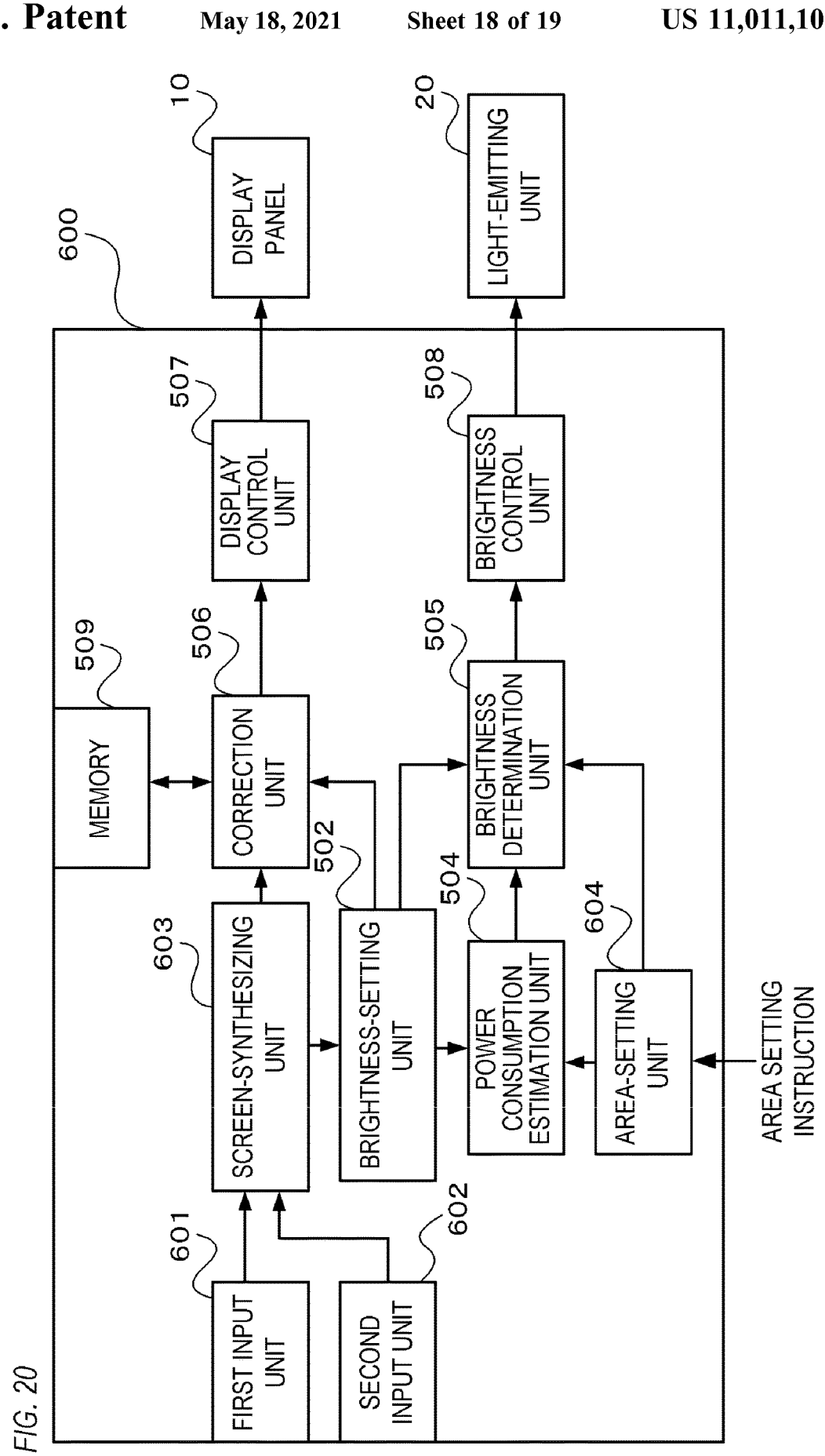
FIG. 20 is a block diagram showing an example configuration of a display apparatus according to a sixth embodiment.

FIG. 20 is a block diagram showing function blocks of a display apparatus. The display apparatus includes the display panel 10, the light-emitting unit 20, and a control unit 600. The control unit 600 includes a first input unit 601, a second input unit 602, a screen-synthesizing unit 603, an area-setting unit 604, the brightness-setting unit 502, the power consumption estimation unit 504, the brightness determination unit 505, the correction unit 506, the display control unit 507, and the brightness control unit 508. Note that description of functions described in other embodiments has been omitted.

The control unit 600 receives two types of image data, sets the emission brightnesses of the respective light sources on the basis of synthesized image data obtained by synthesizing the two types of image data, and when the light-emitting unit is driven at the set emission brightnesses, determines whether or not the power consumption of the light-emitting unit exceeds the predetermined threshold. Further, when the power consumption of the light-emitting unit exceeds the predetermined threshold after the light-emitting unit is driven at the set emission brightnesses, the control unit 600 determines an emission brightness to be used to control each of the light sources by executing brightness correction processing for reducing the set emission brightnesses. In response to a user operation, the control unit 600 selects at least one of the plurality of pieces of received image data as target image data. The control unit 600 then sets an area of the screen of the display panel 10 that corresponds to the specified image data as a specified area (a target area). Then, when executing the brightness correction processing, the control unit 600 excludes the light sources corresponding to the specified area from the brightness correction processing.

Similarly to the input unit 501 according to the fifth embodiment, the first input unit 601 and the second input unit 602 are respectively constituted by interfaces on which image data are input (received). The first input unit 601 and the second input unit 602 respectively output the image data input therein to the screen-synthesizing unit 603.

Figure 21A:
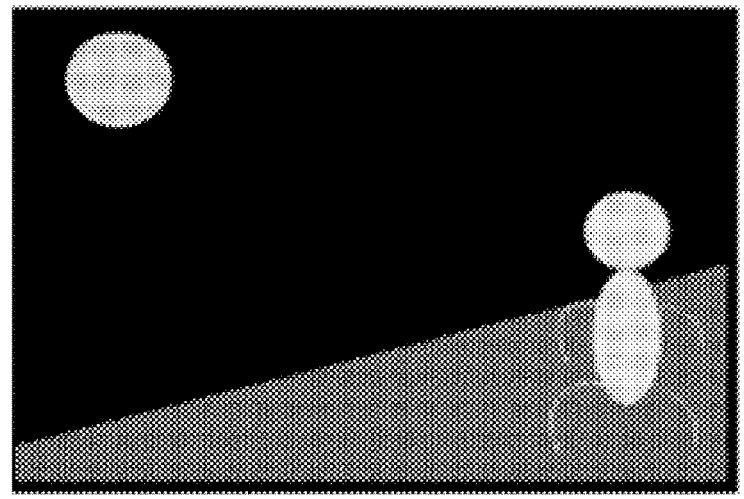
FIGS. 21A and 21B are schematic views showing examples of input image data according to the sixth embodiment.
Figure 21B:
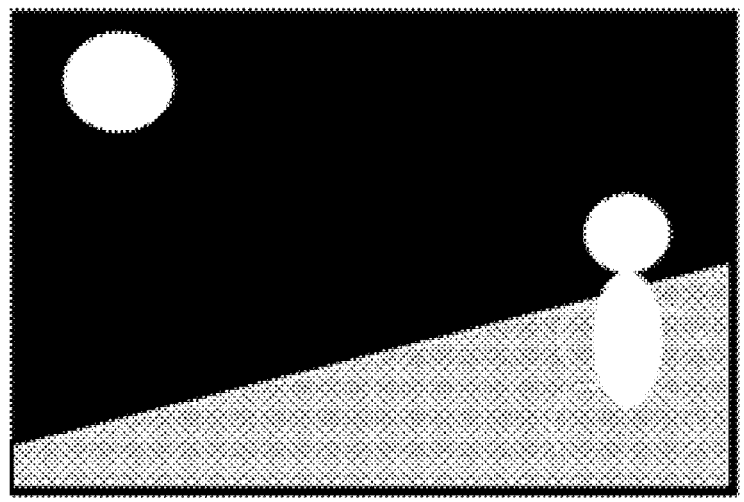
Figure 21C:
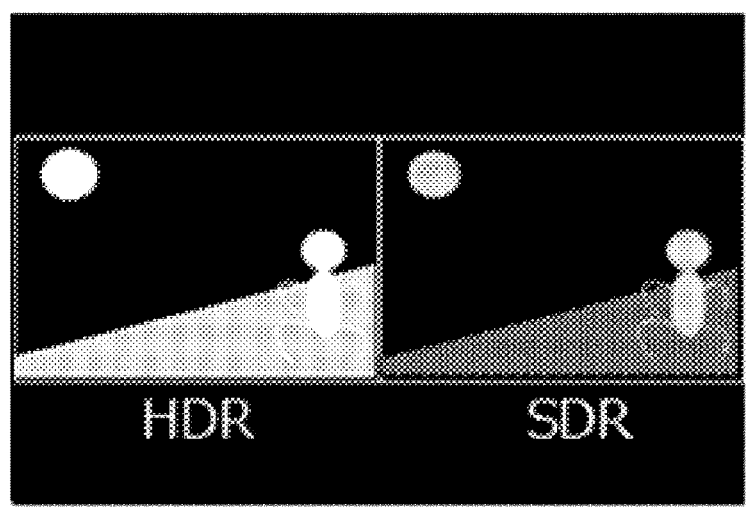
FIG. 21C is a schematic view showing an example of synthesized image data according to the sixth embodiment.

The screen-synthesizing unit 603 generates a synthesized image (synthesized image data) by synthesizing an image (input image data) input (received) from the first input unit 601 and an image (input image data) input from the second input unit 602. For example, the synthesized image is generated by disposing the two input images (input image data) so as to fit on the single screen of the display panel 10. It is assumed here that images shown in FIGS. 21A and 21B are input. FIGS. 21A and 21B respectively show images captured by a single video camera, for example. FIG. 21A shows an image output according to SDR standards, while FIG. 21B shows an image output according to HDR standards. SDR stands for Standard Dynamic Range and denotes the dynamic range of image data defined by the conventional broadcasting standard ITU-R BT. 709 (ITU: International Telecommunication Union), for example. HDR stands for High Dynamic Range and denotes a wider dynamic range than SDR. When the image sizes of the respective input images are identical to the image size (screen size; display size) of the display panel 10, image size reduction processing is implemented on the input images so as to generate a synthesized image in which the two input images fit on the single screen, as shown in FIG. 21C. The screen-synthesizing unit 603 outputs the synthesized image to the correction unit 506 and the brightness-setting unit 502.

The area-setting unit 604 specifies the light sources corresponding to the specified area, similarly to the area-setting unit 503. In this embodiment, the area-setting unit 604 selects at least one of the plurality of pieces of input image data as specified image data in response to a user operation. The area-setting unit 604 then calculates an image area, within the synthesized image data generated by the screen-synthesizing unit 603, in which the specified image data are disposed, and specifies the light sources (specified light sources) corresponding to the specified area. In the specified area, emission brightness correction processing is not performed, and therefore the effect of the correction processing on the input image data (the specified image data) that are viewed by the user as a reference can be reduced. The user operation is an operation executed on a physical switch or a GUI displayed on the screen, for example, to specify the input image data. When the user does not execute the operation, one of the two pieces of input image data that has been determined in advance may be selected as the specified image data. When the two pieces of input image data are constituted by an image output according to HDR standards (HDR image data) and an image output according to SDR standards (SDR image data), the user may perform setting in advance so that the SDR image data are set as the specified image data. The area-setting unit 604 outputs information indicating the specified light sources to the power consumption estimation unit 504 and the brightness determination unit 505.

According to this embodiment, by excluding the light sources (the specified light sources) corresponding to the area (the target area; the specified area) of the specified image data from adjustment processing based on the power consumption, variation in the display brightness of the specified image data can be suppressed. When an SDR image and an HDR image are checked simultaneously in a site where image creation is conducted or the like, the HDR image may be adjusted using the SDR image as a reference. According to this embodiment, the effect of the power consumption on the display brightness of the SDR image used as a reference can be reduced, and therefore work can be carried out with stability.

Note that in this embodiment, a case of two inputs was described as an example, but the functions (processing) of this embodiment may also be applied to four inputs and so on. In other words, the number of input units may be more than two, and the number of pieces of input image data may be more than two. In this case, two or more pieces of input image data may be selected as the specified image data (the input image data on which the brightness is to be fixed).

Further, according to this embodiment, the power consumption is estimated on the basis of a synthesized image. However, when, as a result of the loading processing (the adjustment processing based on the power consumption), a visual impression (the display brightness and so on) obtained from the input image that is not the specified image (the specified image data) deviates greatly from the visual impression obtained when the input image is displayed on a single screen alone, it may be difficult to carry out a stable editing operation. For example, when the visual impression obtained from the image in FIG. 21B when this image is displayed alone on a single screen differs greatly from the visual impression obtained from the image in FIG. 21B when the synthesized image in FIG. 21C is displayed, it may be difficult to carry out a stable editing operation. Therefore, the power consumption when the input image that is not the specified image is displayed alone (on the entire screen) may also be estimated, and the power consumption when the input image that is not the specified image is displayed alone may be compared with the power consumption when the synthesized image is displayed (on the entire screen). The brightness may then be adjusted on the basis of the larger power consumption. Further, the corrected image (corrected image data) described in the first embodiment and so on may be generated on the basis of the larger power consumption and the predetermined power consumption (the threshold). In so doing, a difference (a deviation) between the visual impression obtained from the respective input images when the synthesized image is displayed and the visual impression obtained when an input image is displayed alone can be suppressed.

Furthermore, in the power consumption estimation unit 504 according to the fifth and sixth embodiments, the power consumption WIS of the specified light sources corresponding to the specified area is estimated for each frame, but the power consumption WIS varies due to slight variation in the image data of the specified area. In this case, the coefficient α used to correct the emission brightnesses of the light sources that are not specified light sources also varies, leading to variation in the brightness outside the specified area, and as a result, the user may experience a sense of disturbance. Hence, the power consumption estimation unit 504 may calculate, by estimation, a maximum power consumption of the specified light sources (the maximum envisaged power consumption in the specified area), and use this value as the power consumption WIS. The maximum power consumption may be calculated by estimation when the user issues an instruction to modify the settings of the display apparatus, for example to modify the set specified area or the set display brightness. The maximum power consumption may also be calculated by estimation when the format of the input image data is modified. The corrected image data described in the first embodiment and so on may then be generated on the basis of the maximum envisaged power consumption in the specified area (the target area), the power consumption based on the synthesized image data in the non-target area, and the predetermined power consumption (the threshold). In so doing, variation in the brightness outside the specified area can be suppressed even when the image data in the specified area vary slightly, and as a result, the user can carry out operations with stability.

Note that the respective function units of the first to sixth embodiments may be, but do not have to be, constituted by individual hardware. The functions of two or more function units may be realized using shared hardware. Each of the plurality of functions of a single function unit may be realized by individual hardware. Further, two or more functions of a single function unit may be realized by shared hardware. Furthermore, the respective function units may be, but do not have to be, realized by hardware. For example, the apparatus may include a processor and a memory storing a control program, and the functions of at least some of the function units of the apparatus may be realized by having the processor read the control program from the memory and execute the program.

Further, in the first to sixth embodiments, whether or not the power generated during the loading processing exceeds the threshold is estimated, but instead, the loading processing may be determined in accordance with a panel module or a backlight module. In this case, information determined in relation to the loading processing may be received from the panel module or the backlight module. Then, on the basis of the received information, the image data in the non-target area may be corrected while leaving the image data in the target area uncorrected, whereupon the corrected image data may be input into the panel module or the backlight module. Similar effects can be obtained in this case.

The first to sixth embodiments are merely examples, and configurations obtained by appropriately amending or modifying the configurations of the first to sixth embodiments within the scope of the spirit of the present invention are also included in the present invention. Configurations obtained by appropriately combining the configurations of the first to sixth embodiments are likewise included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-181309, filed on Sep. 21, 2017, Japanese Patent Application No. 2018-108498, filed on Jun. 6, 2018, and Japanese Patent Application No. 2018-120723, filed on Jun. 26, 2018, which are hereby incorporated by reference herein in their entirety.

What is claimed is:

1. A display apparatus comprising:
a display configured to display an image on a screen of a display; and
at least one processor and/or at least one circuit to perform operations of the following units:
(1) a setting unit configured to set a first area of the screen and a second area of the screen,
(2) a determining unit configured to determine whether or not a power consumption of the display exceeds a threshold in a case that the display displays an image based on an input image, and
(3) a control unit configured to control a display brightness range of the screen based on a result of the determination, wherein the display brightness range is a range of brightness that can be displayed on the screen,
wherein if the power consumption of the display exceeds the threshold in the case that the display displays the image based on the input image, the control unit reduces an upper limit value of a display brightness range of the second area of the screen below an upper limit value of a display brightness range of the first area of the screen, so that the power consumption of the display does not exceed the threshold.

2. The display apparatus according to claim 1, wherein the upper limit value of the display brightness range is a display brightness in a case where a white area of the input image is displayed by the display.

3. The display apparatus according to claim 1, wherein the setting unit sets the first area in response to an operation by a user.

4. The display apparatus according to claim 1, wherein the setting unit sets the first area on the basis of the input image and a ratio of a size of the first area relative to a size of the screen, the ratio being specified by a user.

5. The display apparatus according to claim 1, further comprising:
an input interface configured to receive a plurality of input images,
wherein the at least one processor and/or the at least one circuit further perform operations of a synthesizing unit configured to generate a synthesized image by synthesizing the plurality of input images, and
wherein in response to a user operation, the setting unit selects at least one of the plurality of input images, and sets, within the synthesized image generated by the synthesizing unit, an area, in which the selected input image is disposed, as the first area.

6. The display apparatus according to claim 1, wherein the control unit reduces an upper limit value of a display brightness of the second area of the screen by controlling the display on the basis of a corrected image obtained by reducing a gradation value of a part of the input image that corresponds to the second area.

7. The display apparatus according to claim 6, wherein the control unit controls the display on the basis of the corrected image, which is obtained by reducing the gradation value of the part of the input image that corresponds to the second area by using a coefficient based on the threshold.

8. The display apparatus according to claim 7, wherein the control unit generates the corrected image by reducing the gradation value of the part of the input image that corresponds to the second area on the basis of the threshold and a power consumption in a case where an image is displayed by the display on the basis of the input image.

9. The display apparatus according to claim 5, wherein the control unit (a) generates a corrected image by reducing a gradation value of a part of the synthesized image that corresponds to the second area on the basis of a maximum envisaged power consumption in the first area, a power consumption based on the synthesized image in the second area, and the threshold, and (b) reduces an upper limit value of a display brightness of the second area by controlling the display on the basis of the corrected image.

10. The display apparatus according to claim 5, wherein the control unit (a) generates a corrected image by comparing a power consumption in a case where only the input image not selected from the plurality of input images are displayed, with a power consumption in a case where the synthesized image is displayed, and reducing a gradation value of a part of the synthesized image that corresponds to the second area on the basis of the larger of the compared power consumptions and the threshold, and (b) reduces an upper limit value of a display brightness of the second area by controlling the display on the basis of the corrected image.

11. The display apparatus according to claim 1, wherein the display is a self-luminous display panel.

12. A display apparatus comprising:
light sources;
a display panel that displays an image on a screen by transmitting light emitted from the light sources on the basis of an input image; and
at least one processor and/or at least one circuit that perform operations of the following units:

(1) a brightness setting unit configured to set emission brightnesses for the respective light sources on the basis of brightness levels of parts of the input image corresponding to the respective light sources; and (2) an emission control unit configured to control the respective light sources on the basis of the emission brightnesses of the respective light sources, set by the brightness setting unit, wherein if a power consumption in a case where the respective light sources are controlled using the set emission brightnesses of the respective light sources is larger than a threshold, the emission control unit (a) controls a light source corresponding to a first area of the screen, among the light sources, to emit light with the emission brightness set for the light source, and (b) controls a light source corresponding to a second area of the screen, among the light sources, to emit light with a lower emission brightness than the emission brightness set for the light source.

13. The display apparatus according to claim 12, wherein the emission control unit corrects the emission brightness set for the light source corresponding to the second area on the basis of the threshold and a power consumption in a case where the respective light sources are controlled using the set emission brightnesses of the respective light sources.

14. The display apparatus according to claim 12, wherein the at least one processor and/or the at least one circuit further perform operations of a processing unit configured to generate a corrected image by correcting a gradation value of a part of the input image that corresponds to the second area on the basis of the threshold and the power consumption in a case where the respective light sources are controlled using the set emission brightnesses of the respective light sources.

15. A control method for a display apparatus, the method comprising:

displaying an image on a screen of a display;

setting a first area of the screen and a second area of the screen;

determining whether or not a power consumption of the display exceeds a threshold in a case that the display displays an image based on an input image; and controlling a display brightness range of the screen based on a result of the determination, wherein the display brightness range is a range of brightness that can be displayed on the screen, wherein in the controlling, if the power consumption of the display exceeds the threshold in the case that the display displays the image based on the input image, an upper limit value of a display brightness range of the second area of the screen is reduced below an upper limit value of a display brightness range of the first area of the screen, so that the power consumption of the display does not exceed the threshold.

16. A non-transitory computer-readable medium that stores a program, wherein the program causes a computer to execute a method comprising:

displaying an image on a screen of a display;

setting a first area of the screen and a second area of the screen;

determining whether or not a power consumption of the display exceeds a threshold in a case that the display displays an image based on an input image; and controlling a display brightness range of the screen based on a result of the determination, wherein the display brightness range is a range of brightness that can be displayed on the screen, wherein in the controlling, if the power consumption of the display exceeds the threshold in the case that the display displays the image based on the input image, an upper limit value of a display brightness range of the second area of the screen is reduced below an upper limit value of a display brightness range of the first area of the screen, so that the power consumption of the display does not exceed the threshold.

17. A display apparatus that displays an image on a screen based on an input image, the display apparatus comprising:

at least one processor and/or at least one circuit to perform operations of: performing a correction processing to reduce brightness of a part of the input image, if a power consumption of the display apparatus exceeds a predetermined power consumption in a case that the image is displayed based on the input image, wherein the correction processing is not applied to a part of the input image corresponding to a first area of the screen, and is applied to a part of the input image corresponding to a second area of the screen, the second area being different from the first area, and wherein the correction processing which is not applied to the part of the input image corresponding to the first area of the screen and is applied to the part of the input image corresponding to the second area of the screen comprises multiplying each of Red, Green, and Blue gradation values by K/255, where K is a gradation value, so as to apply a common reduction rate to the Red, Green, and Blue gradation values.

18. The display apparatus according to claim 17, wherein the correction processing is a processing to apply a gain to gradation values of the input image, and wherein the gain to be applied to the part of the input image corresponding to the second area is determined based on a size of the second area and the predetermined power consumption.

19. The display apparatus according to claim 17, wherein the correction processing is a processing to apply a gain to gradation values of the input image, and wherein the gain to be applied to the part of the input image corresponding to the second area is determined based on a size of the second area, the predetermined power consumption, and the power consumption of the display apparatus in the case that the image is displayed based on the input image.

* * * * *